United States Patent
Hu et al.

(10) Patent No.: US 10,420,032 B2
(45) Date of Patent: Sep. 17, 2019

(54) PREAMBLE SEQUENCE SENDING METHOD AND APPARATUS

(71) Applicant: Huawei Technologies Co., Ltd., Shenzhen (CN)

(72) Inventors: Wenquan Hu, Lund (SE); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 15/637,505

(22) Filed: Jun. 29, 2017

(65) Prior Publication Data
US 2017/0303204 A1  Oct. 19, 2017

Related U.S. Application Data

(63) Continuation of application No. PCT/CN2016/070390, filed on Jan. 7, 2016.

(30) Foreign Application Priority Data

Jan. 30, 2015 (CN) .......................... 2015 1 0052923

(51) Int. Cl.
  *H04W 52/06* (2009.01)
  *H04W 74/08* (2009.01)
  (Continued)

(52) U.S. Cl.
  CPC ......... *H04W 52/06* (2013.01); *H04W 52/242* (2013.01); *H04W 52/28* (2013.01);
  (Continued)

(58) Field of Classification Search
  CPC ... H04W 52/06; H04W 52/242; H04W 52/28; H04W 52/325; H04W 52/367; H04W 52/50; H04W 74/0833
  See application file for complete search history.

(56) References Cited

U.S. PATENT DOCUMENTS

2009/0305693 A1  12/2009  Shimomura et al.
2013/0035084 A1  2/2013  Song et al.
(Continued)

FOREIGN PATENT DOCUMENTS

CN  101569231 A  10/2009
CN  102724746 A  10/2012
(Continued)

OTHER PUBLICATIONS

Samsung, "PRACH Coverage Enhancements for MTC UEs", Feb. 10-14, 2014, 3GPP TSG RAN WG1 #76, R1-140355, pp. 1-5 (Year: 2014).*

(Continued)

*Primary Examiner* — Paul H Masur
(74) *Attorney, Agent, or Firm* — Conley Rose, P.C.

(57) ABSTRACT

A preamble sequence sending method and apparatus are provided. The method includes sending, by user equipment (UE), a first preamble sequence according to a first transmit power and using a repetition factor $N_1$; if the UE fails to receive, in a preset time period after the first preamble sequence is sent, a response message that is sent by a network-side device and that is corresponding to the first preamble sequence, switching, by the UE, to a next repetition factor $N_2$, where a quantity of consecutive sending times indicated by the next repetition factor $N_2$ is greater than a quantity of consecutive sending times indicated by the repetition factor $N_1$; and sending, by the UE, a second preamble sequence according to a second transmit power and using the next repetition factor $N_2$.

16 Claims, 3 Drawing Sheets

(51) Int. Cl.

| | | |
|---|---|---|
| *H04W 52/24* | (2009.01) | |
| *H04W 52/28* | (2009.01) | |
| *H04W 52/32* | (2009.01) | |
| *H04W 52/36* | (2009.01) | |
| *H04W 52/50* | (2009.01) | |

(52) U.S. Cl.
CPC ....... *H04W 52/325* (2013.01); *H04W 52/367* (2013.01); *H04W 52/50* (2013.01); *H04W 74/0833* (2013.01)

(56) References Cited

U.S. PATENT DOCUMENTS

| | | | |
|---|---|---|---|
| 2013/0188473 | A1 | 7/2013 | Dinan |
| 2015/0016312 | A1 | 1/2015 | Li et al. |
| 2015/0078188 | A1* | 3/2015 | Xu ................... H04W 52/367 370/252 |
| 2015/0181533 | A1* | 6/2015 | Chen ................... H04W 52/146 455/522 |
| 2015/0312887 | A1 | 10/2015 | Xia et al. |
| 2016/0150570 | A1* | 5/2016 | Wang ............... H04W 74/0833 370/329 |
| 2016/0242155 | A1 | 8/2016 | Xu et al. |
| 2016/0302080 | A1* | 10/2016 | Hwang ................ H04W 4/70 |
| 2016/0337988 | A1* | 11/2016 | Nan ..................... H04W 74/08 |
| 2016/0337991 | A1* | 11/2016 | Zhang ................. H04W 4/70 |
| 2016/0353440 | A1* | 12/2016 | Lee ..................... H04W 4/70 |
| 2017/0041888 | A1* | 2/2017 | Wu ...................... H04L 1/08 |
| 2017/0181194 | A1 | 6/2017 | Huang et al. |

FOREIGN PATENT DOCUMENTS

| | | | |
|---|---|---|---|
| CN | 103782647 | A | 5/2014 |
| CN | 103828447 | A | 5/2014 |
| CN | 103916974 | A | 7/2014 |
| EP | 3079431 | A1 | 10/2016 |
| WO | 2014110805 | A1 | 7/2014 |
| WO | 2016033778 | A1 | 3/2016 |

OTHER PUBLICATIONS

Sharp, "On PRACH coverage enhancement for MTC UE", Feb. 10-14, 2014, 3GPP TSG RAN WG1 Meeting #76, R1-140640, pp. 1-5 (Year: 2014).*
InterDigital, "PRACH Coverage Enhancement for MTC UE", Feb. 10-14, 2014, 3GPP TSG RAN WG1 Meeting #76, R1-140649, pp. 1-3 (Year: 2014).*
Machine Translation and Abstract of Chinese Publication No. CN102724746, Oct. 10, 2012, 28 pages.
Machine Translation and Abstract of International Publication No. WO2016033778, Mar. 10, 2016, 185 pages.
"3rd Generation Partnership Project; Technical Specification Group Radio Access Network; Physical layer procedures (FDD) (Release 12)," 3GPP TS 25.214, V12.1.0, Technical Specification, Dec. 2014, 137 pages.
"3rd Generation Partnership Project; Technical Specification Group Radio Access Network; Radio Resource Control (RRC); Protocol specification (Release 12)," 3GPP TS 25.331, V12.4.0, Technical Specification, Dec. 2014, 2223 pages.
3rd Generation Partnership Project; Technical Specification Group Radio Access Network; Evolved Universal Terrestrial Radio Access (E-UTRA); Physical layer procedures (Release 12), 3GPP TS 36.213, V12.4.0, Technical Specification, Dec. 2014, 225 pages.
"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.4.0, Technical Specification, Dec. 2014, 60 pages.
Foreign Communication From a Counterpart Application, PCT Application No. PCT/CN2016/070390, English Translation of International Search Report dated Apr. 1, 2016, 3 pages.
Foreign Communication From a Counterpart Application, PCT Application No. PCT/CN2016/070390, English Translation of Written Opinion dated Apr. 1, 2016, 6 pages.
LG Electronics, "PRACH transmission for MTC coverage enhancement," R1-140304, 3GPP TSG RAN WG1 Meeting #76, Feb. 10-14, 2014, 4 pages.
Huawei, "Consideration on PRACH power ramping," R2-156469, 3GPP TSG RAN WG2 Meeting #92, Nov. 16-20, 2015, 4 pages.
Foreign Communication From a Counterpart Application, European Application No. 16742645.1, Extended European Search Report dated Nov. 20, 2017, 10 pages.
Foreign Communication From a Counterpart Application, Chinese Application No. 201510052923.6, Chinese Office Action dated Nov. 8, 2018, 9 pages.

* cited by examiner

PREAMBLE SEQUENCE SENDING METHOD AND APPARATUS

CROSS-REFERENCE TO RELATED APPLICATIONS

This application is a continuation of International Application No. PCT/CN2016/070390, filed on Jan. 7, 2016, which claims priority to Chinese Patent Application No. 201510052923.6, filed on Jan. 30, 2015, both of which are hereby incorporated by reference in their entireties.

TECHNICAL FIELD

This application relates to the field of communications technologies, and in particular, to a preamble sequence sending method and apparatus.

BACKGROUND

In a Long Term Evolution (LTE) system, a random access channel (RACH) procedure of user equipment (UE) is as follows.

A higher-layer request triggers a physical layer to send a preamble. The request includes a preamble index, a target preamble received power (PREAMBLE_RECEIVED_TARGET_POWER), a corresponding random access-radio network temporary identifier (RA-RNTI), and physical random access channel (PRACH) resource information.

A preamble transmit power $P_{PRACH}$ is determined according to the following formula: $P_{PRACH}=\min\{P_{CMAX,c}(i), \text{PREAMBLE\_RECEIVED\_TARGET\_POWER}+PL_c\}\_$ [dBm], where $P_{CMAX,c}(i)$ is a maximum permissible transmit power configured at the $i^{th}$ subframe of a serving cell c in which the UE is located, $PL_c$ is an estimation value obtained by the UE by estimating a downlink path loss of the serving cell c, and min{ } is a MIN operation.

Then, a preamble sequence is selected from a preamble sequence set using the preamble index. On an indicated PRACH resource, the selected preamble sequence is sent according to the preamble transmit power $P_{PRACH}$.

There may be three cases after the UE sends the preamble sequence. In a first case, the UE detects a physical downlink control channel (PDCCH) according to the RA-RNTI, and detects a response to the sent preamble sequence in a corresponding downlink data block; then, the UE sends an uplink transport block according to content of the response. In a second case, the UE detects a PDCCH according to the RA-RNTI, but fails to find a response to the sent preamble sequence in a corresponding downlink data block; then, the UE determines, according to a higher-layer indication, whether to send a preamble sequence again. In a third case, the UE fails to receive a response from a network side; then, the UE determines, according to a higher-layer indication, whether to send a preamble sequence again.

In the second or third case, a Media Access Control (MAC) layer updates the target preamble received power and a new PRACH parameter, and sends a preamble sequence again. An updated target preamble received power is: preambleInitialReceivedTargetPower+DELTA_PREAMBLE+PREAMBLE_TRANSMISSION_COUNTER−1)* powerRampingStep, where preambleInitialReceivedTargetPower is an initial target preamble received power, sourcing from broadcast information sent by the network side; powerRampingStep is a power adjustment step, also sourcing from the broadcast information sent by the network side; DELTA_PREAMBLE is a preamble sequence format offset value, and is a protocol-specified value; and PREAMBLE_TRANSMISSION_COUNTER is a preamble transmission counter value, and can be obtained according to a current counter value.

Then, the physical layer is instructed to send the preamble sequence using the PRACH, the corresponding RA-RNTI, the preamble index, and the updated target preamble received power.

In a Universal Mobile Telecommunications System (UMTS), a random access channel procedure of UE is as follows.

On an available RACH subchannel corresponding to a given access service class (ASC), a next available access timeslot is selected. A new signature is randomly selected from an available signature corresponding to the given ASC. A preamble retransmission counter value is set as Preamble Retrans Max. If a preamble initial power (Preamble_Initial_Power) is less than a preset minimum value, a preamble required power is set between the preamble initial power and the preset minimum value; otherwise, a preamble required power is set to the preamble initial power. If the preamble required power is greater than a preset maximum value, a preamble transmit power is set to the preset maximum value; if the preamble required power is less than a preset minimum value, a preamble transmit power is set between the preamble required power and the preset minimum value. A preamble sequence is sent using the selected uplink access timeslot, the signature, and the preamble transmit power. If the UE fails to detect an acquisition indication of the corresponding signature in a downlink access timeslot corresponding to the uplink access timeslot, a next available access timeslot is selected on an available RACH subchannel corresponding to the given ASC. A new signature is randomly selected from an available signature corresponding to the given ASC. The preamble required power is increased by one power adjustment step (Power Ramp Step [dB]). If a preamble required power exceeds a maximum permissible power 6 dB, the UE sends a status ("no positive response available on an acquisition indication channel") of a physical layer to a MAC layer and exits a random access procedure at the physical layer. The preamble retransmission counter is decreased by 1. If a preamble retransmission counter is greater than 0, a preamble sequence is sent again using the selected uplink access timeslot, the new signature, and the preamble transmit power. If a preamble retransmission counter is equal to 0, the UE sends the status ("no positive response available on an acquisition indication channel") of the physical layer to the MAC layer and exits the random access procedure at the physical layer. If a negative acquisition indication is detected, the UE sends a status ("no positive response available on an acquisition indication channel") of a physical layer to a MAC layer and exits a random access procedure at the physical layer.

The UE calculates, based on measurement of a downlink signal power, an initial transmit power Preamble_Initial_Power of a PRACH as follows: Preamble_Initial_Power=CPICH_TX_Power−CPICH_RSCP+UL_interference+Constant Value, where CPICH_RSCP is a received pilot channel power obtained by the UE by means of measurement, CPICH_Tx_Power is a transmit power of a downlink pilot channel, UL_interference is an uplink interference, and Constant_value is a constant. CPICH_Tx_Power, UL_interference, and Constant_value may be sent by a network to the UE using a broadcast channel.

It can be seen that, in the prior art, a manner of improving a transmission success rate by increasing a transmit power has a limited effect.

SUMMARY

This application provides a preamble sequence sending method and apparatus, so as to resolve a technical problem in the prior art that a low transmission success rate is caused when a transmit power is increased to retransmit a preamble sequence.

A first aspect of this application provides a preamble sequence sending method, including sending, by user equipment (UE), a first preamble sequence according to a first transmit power and using a repetition factor $N_1$; if the UE fails to receive, in a preset time period after the first preamble sequence is sent, a response message that is sent by a network-side device and that is corresponding to the first preamble sequence, switching, by the UE, to a next repetition factor $N_2$, where a quantity of consecutive sending times indicated by the next repetition factor $N_2$ is greater than a quantity of consecutive sending times indicated by the repetition factor $N_1$; and sending, by the UE, a second preamble sequence according to a second transmit power and using the next repetition factor $N_2$.

With reference to the first aspect, in a first possible implementation of the first aspect, before the sending, by the UE, a second preamble sequence according to a second transmit power and using the next repetition factor $N_2$, the UE further determines the second transmit power using the following formula:

$$P_{PRACH}1 = \min\{P_{MAX}, \text{PREAMBLE\_RECEIVED\_TARGET\_POWER1} + PL\},$$

where

PREAMBLE_RECEIVED_TARGET_POWER1= preambleInitialReceivedTargetPower+DELTA_PREAMBLE+(PREAMBLE_TRANSMISSION_COUNTER−1)*(powerRampingStep)+ delta($N_{l+1}$), where
$P_{PRACH}1$ is the second transmit power, min{ } is a MIN operation, $P_{MAX}$ is a maximum permissible transmit power of the UE, PL is an estimation value obtained by the UE by estimating a downlink path loss of a cell in which the UE is located, preambleInitialReceivedTargetPower is an initial target preamble received power, DELTA_PREAMBLE is a preamble sequence format offset value, PREAMBLE_TRANSMISSION_COUNTER is a preamble transmission counter, powerRampingStep is a power adjustment step, $N_{l+1}$ is the next repetition factor $N_2$, and delta ($N_{l+1}$) is a decreasing function of the next repetition factor $N_2$.

With reference to the first aspect or the first possible implementation of the first aspect, in a second possible implementation of the first aspect, the switching, by the UE, to a next repetition factor $N_2$ includes determining, by the UE, a third transmit power, where the third transmit power is greater than the first transmit power; and switching to the next repetition factor $N_2$ when the third transmit power exceeds the maximum permissible transmit power of the UE.

With reference to the second possible implementation of the first aspect, in a third possible implementation of the first aspect, the UE determines the third transmit power using the following formula:

$$P_{PRACH}2 = \min\{P_{MAX}, \text{PREAMBLE\_RECEIVED\_TARGET\_POWER2} + PL\},$$

where

PREAMBLE_RECEIVED_TARGET_POWER2= preambleInitialReceivedTargetPower+DELTA_PREAMBLE+(PREAMBLE_TRANSMISSION_COUNTER−1)*(powerRampingStep)+ delta($N_l$), where
$P_{PRACH}2$ is the third transmit power, min{ } is a MIN operation, $P_{MAX}$ is the maximum permissible transmit power of the UE, PL is the estimation value obtained by the UE by estimating the downlink path loss of the cell in which the UE is located, preambleInitialReceivedTargetPower is the initial target preamble received power, DELTA_PREAMBLE is the preamble sequence format offset value, PREAMBLE_TRANSMISSION_COUNTER is the preamble transmission counter, powerRampingStep is the power adjustment step, $N_l$ is the repetition factor $N_1$, and delta ($N_l$) is a decreasing function of the repetition factor $N_1$.

With reference to the first aspect, in a fourth possible implementation of the first aspect, before the sending, by the UE, a second preamble sequence according to a second transmit power and using the next repetition factor $N_2$, the UE further determines the second transmit power using the following formula:

$$P_{PRACH}3 = \min\{P_{MAX}, \text{PREAMBLE\_RECEIVED\_TARGET\_POWER3} + PL + \text{delta }(N_{l+1})\},$$

where $P_{PRACH}3$ is the second transmit power, min{ } is a MIN operation, $P_{MAX}$ is a maximum permissible transmit power of the UE, PL is an estimation value obtained by the UE by estimating a downlink path loss of a cell in which the UE is located, PREAMBLE_RECEIVED_TARGET_POWER3 is a target preamble received power corresponding to the second preamble sequence, $N_{l+1}$ is the next repetition factor $N_2$, and delta ($N_{l+1}$) is a decreasing function of the next repetition factor $N_2$.

With reference to the fourth possible implementation of the first aspect, in a fifth possible implementation of the first aspect, when the first preamble sequence is the first preamble sequence in a random access procedure, before the sending, by UE, a first preamble sequence according to a first transmit power and using a repetition factor $N_1$, the method further includes obtaining, by the UE, a target preamble received power corresponding to the first preamble sequence; and determining, by the UE, the first transmit power according to the repetition factor $N_1$, the maximum permissible transmit power of the UE, the target preamble received power corresponding to the first preamble sequence, and the estimation value obtained by the UE by estimating the downlink path loss of the cell in which the UE is located.

With reference to the fifth possible implementation of the first aspect, in a sixth possible implementation of the first aspect, the UE determines the first transmit power using the following formula:

$$P_{PRACH}4 = \min\{P_{MAX}, \text{PREAMBLE\_RECEIVED\_TARGET\_POWER4} + PL + \text{delta}(N_l)\},$$

where $P_{PRACH}4$ is the first transmit power, $P_{MAX}$ is the maximum permissible transmit power of the UE, PREAMBLE_RECEIVED_TARGET_POWER is the target preamble received power corresponding to the first preamble sequence, $N_l$ is the repetition factor $N_1$, delta ($N_l$) is a decreasing function of the repetition factor $N_1$, min{ } is a MIN operation, and PL is the estimation value.

With reference to the third possible implementation of the first aspect or the sixth possible implementation of the first aspect, in a seventh possible implementation of the first aspect, delta ($N_1$) is $-10 \log (N_1)$ or $-10 \log (N_1)$+offset ($N_1$), and offset ($N_1$) is an offset constant corresponding to the repetition factor $N_1$.

With reference to the first possible implementation of the first aspect or the fourth possible implementation of the first aspect, in an eighth possible implementation of the first aspect, delta ($N_{l+1}$) is $-10 \log (N_{l+1})$ or $-10 \log (N_{l+1})$+offset ($N_{l+1}$), and offset ($N_{l+1}$) is an offset constant corresponding to the next repetition factor $N_2$.

With reference to the first aspect or the fourth possible implementation of the first aspect, in a ninth possible implementation of the first aspect, when the first preamble sequence is the first preamble sequence in a random access procedure, the method further includes obtaining, by the UE, a target preamble received power corresponding to the first preamble sequence; obtaining, by the UE, an offset constant offset ($N_1$) corresponding to the repetition factor $N_1$; and determining, by the UE, the first transmit power according to the maximum permissible transmit power of the UE, the target preamble received power corresponding to the first preamble sequence, the offset constant offset ($N_1$) corresponding to the repetition factor $N_1$, and the estimation value obtained by the UE by estimating the downlink path loss of the cell in which the UE is located.

With reference to the ninth possible implementation of the first aspect, in a tenth possible implementation of the first aspect, the UE determines the first transmit power using the following formula:

$P_{PRACH}5 = \min\{P_{MAX}, \text{PREAMBLE\_RECEIVED\_TARGET\_POWER5} + PL - 10 \log(N_1) + \text{offset}(N_1)\}$, where $P_{PRACH}5$ is the first transmit power, min{ } is a MIN operation, $P_{MAX}$ is the maximum permissible transmit power of the UE, PREAMBLE_RECEIVED_TARGET_POWER5 is the target preamble received power corresponding to the first preamble sequence, PL is the estimation value, and $N_l$ is the repetition factor $N_1$.

With reference to the first aspect or any one of the first possible implementation of the first aspect to the tenth possible implementation of the first aspect, in an eleventh possible implementation of the first aspect, before the sending, by UE, a first preamble sequence according to a first transmit power and using a repetition factor $N_1$, the method further includes obtaining, by the UE, a group of sending information corresponding to the repetition factor $N_1$, where the sending information includes a preamble index and a PRACH resource; and the sending, by UE, a first preamble sequence according to a first transmit power and using a repetition factor $N_1$ includes sending, by the UE and on the PRACH resource, according to the first transmit power and using the repetition factor $N_1$, the first preamble sequence corresponding to the preamble index.

With reference to the eleventh possible implementation of the first aspect, in a twelfth possible implementation of the first aspect, the obtaining, by the UE, a group of sending information corresponding to the repetition factor $N_1$ includes reporting, by a physical layer of the UE, the repetition factor $N_1$ to a media access control (MAC) layer of the UE; and receiving, by the physical layer of the UE, the group of sending information that is corresponding to the repetition factor $N_1$ and that is delivered by the MAC layer; or receiving, by a physical layer of the UE, multiple groups of sending information that are separately corresponding to multiple repetition factors including the repetition factor $N_1$ and that are delivered by a MAC layer of the UE; and determining, by the physical layer of the UE according to the repetition factor $N_1$ and in the multiple groups of sending information, the group of sending information corresponding to the repetition factor $N_1$.

With reference to the first aspect, in a thirteenth possible implementation of the first aspect, before the sending, by the UE, a second preamble sequence according to a second transmit power and using the next repetition factor $N_2$, the UE further determines the second transmit power using the following formula:

$$p_{n+1} = p_n + \Delta P_0 + 10\log\left(\frac{N_l}{N_{l+1}}\right),$$

where $p_{n+1}$ is the second transmit power, $p_n$ is the first transmit power, $P_0$ is a power adjustment step, $N_l$ is the repetition factor $N_1$, and $N_{l+1}$ is the next repetition factor $N_2$.

With reference to the thirteenth possible implementation of the first aspect, in a fourteenth possible implementation of the first aspect, when the first preamble sequence is the first preamble sequence in a random access procedure, the UE determines the first transmit power using the following formula:

Preamble_Initial_Power=CPICH_TX_Power−CPICH_RSCP+UL_interference+Constant_Value+delta($N_l$), where Preamble_Initial_Power is the first transmit power, CPICH_Tx_Power is a transmit power of a downlink pilot channel, CPICH_RSCP is a received power of the downlink pilot channel, UL_Interference is an uplink interference, Constant_Value is a constant, $N_l$ is the repetition factor $N_1$, and delta ($N_l$) is a decreasing function of the repetition factor $N_1$.

With reference to the fourteenth possible implementation of the first aspect, in a fifteenth possible implementation of the first aspect, delta ($N_1$) is $-10 \log (N_1)$ or $-10 \log (N_1)$+offset ($N_1$), and offset ($N_1$) is an offset constant corresponding to the repetition factor $N_1$.

With reference to any one of the fourth possible implementation of the first aspect to the fifteenth possible implementation of the first aspect, in a sixteenth possible implementation of the first aspect, the switching, by the UE, to a next repetition factor $N_2$ includes determining, by the UE, the third transmit power, where the third transmit power is greater than the first transmit power; and switching to the next repetition factor $N_2$ when the third transmit power exceeds the maximum permissible transmit power of the UE.

With reference to the first aspect or any one of the first possible implementation of the first aspect to the sixteenth possible implementation of the first aspect, in a seventeenth possible implementation of the first aspect, when the repetition factor $N_1$ is an initial repetition factor, before the sending, by UE, a first preamble sequence according to a first transmit power and using a repetition factor $N_1$, the method further includes determining, by the UE, preamble sequence powers separately corresponding to a first repetition factor and a second repetition factor; and determining that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum power of the UE and the specific constant, or when a preamble sequence power corresponding to the first repetition factor is less than a difference between the maximum permissible transmit power of the UE and a specific constant and a preamble sequence power corresponding to the second repetition factor is greater than or equal to the difference between the maximum power of the UE and the specific constant, where the second repetition factor is less than the first repetition factor and is adjacent to the first repetition factor among repetition factors.

With reference to the first aspect or any one of the first possible implementation of the first aspect to the seventeenth possible implementation of the first aspect, in an eighteenth possible implementation of the first aspect, the repetition factor $N_1$ is corresponding to a first coverage enhancement level of the UE, the next repetition factor $N_2$ is corresponding to a second coverage enhancement level of the UE, and the second coverage enhancement level is higher than the first coverage enhancement level.

With reference to the first aspect or any one of the first possible implementation of the first aspect to the seventeenth possible implementation of the first aspect, in a nineteenth possible implementation of the first aspect, before the switching, by the UE, to a next repetition factor $N_2$, the method includes obtaining, by the UE, the next repetition factor $N_2$ by adding a repetition factor step to the repetition factor $N_1$, where the repetition factor $N_1$ is corresponding to a first coverage enhancement level of the UE; when the next repetition factor $N_2$ is less than or equal to a maximum repetition factor corresponding to the first coverage enhancement level, the next repetition factor $N_2$ is corresponding to the first coverage enhancement level; when the next repetition factor $N_2$ is greater than the maximum repetition factor, the next repetition factor $N_2$ is corresponding to a second coverage enhancement level of the UE; and the second coverage enhancement level is higher than the first coverage enhancement level.

With reference to the nineteenth possible implementation of the first aspect, in a twentieth possible implementation of the first aspect, when the repetition factor $N_1$ is the initial repetition factor, the method further includes receiving, by the UE, the target preamble received power corresponding to the first preamble sequence; and determining, by the UE, the repetition factor $N_1$ according to the target preamble received power, the maximum permissible transmit power of the UE, and the estimation value obtained by the UE by estimating the downlink path loss of the cell in which the UE is located.

With reference to the twentieth possible implementation of the first aspect, in a twenty-first possible implementation of the first aspect, the UE determines the repetition factor $N_1$ using the following formula:

Preamble_Initial_Repetition_Number =

$$\text{Ceil}\left(10^{\frac{PREAMBLE\_RECEIVED\_TARGET\_POWER+PL-P_{MAX}}{10}}\right),$$

where Preamble_Initial_Repetition_Number is the repetition factor $N_1$, Ceil( ) is a round-up function, PREAMBLE_RECEIVED_TARGET_POWER is the target preamble received power, PL is the estimation value, and $P_{MAX}$ is the maximum permissible transmit power.

With reference to the twentieth possible implementation of the first aspect, in a twenty-second possible implementation of the first aspect, the method further includes receiving, by the UE, an offset constant offset ($N_k$) corresponding to the first coverage enhancement level, where $N_k$ is the maximum repetition factor corresponding to the first coverage enhancement level; and the determining, by the UE, the repetition factor $N_1$ according to the target preamble received power, the maximum permissible transmit power of the UE, and the estimation value obtained by the UE by estimating the downlink path loss of the cell in which the UE is located includes determining, by the UE, the repetition factor $N_1$ according to the target preamble received power, the offset constant offset ($N_k$), the maximum permissible transmit power of the UE, and the estimation value obtained by the UE by estimating the downlink path loss of the cell in which the UE is located.

With reference to the nineteenth possible implementation of the first aspect, in a twenty-third possible implementation of the first aspect, when the repetition factor $N_1$ is the initial repetition factor, the method further includes receiving, by the UE, the maximum permissible transmit power of the UE, the constant, and the uplink interference; obtaining, by the UE, the received power of the downlink pilot channel by means of measurement; obtaining, by the UE, the transmit power of the downlink pilot channel; and determining, by the UE, the repetition factor $N_1$ according to the maximum permissible transmit power, the constant, the uplink interference, the received power of the downlink pilot channel, and the transmit power of the downlink pilot channel.

With reference to the twenty-third possible implementation of the first aspect, in a twenty-fourth possible implementation of the first aspect, the UE determines the repetition factor $N_1$ using the following formula:

Preamble_Initial_Repetition_Number =

$$\text{Ceil}\left(10^{\frac{CPICH\_TX\_Power-CPICH\_RSCP+UL\_Interference+Constant\_Value-Maximum\_Allowed\_Power}{10}}\right),$$

where Preamble_Initial_Repetition_Number is the repetition factor $N_1$, Ceil( ) is a round-up function, Maximum_Allowed_Power is the maximum permissible transmit power, CPICH_RSCP is the received power of the downlink pilot channel, CPICH_Tx_Power is the transmit power of the downlink pilot channel, UL_Interference is the uplink interference, and Constant_Value is the constant.

With reference to the twenty-third possible implementation of the first aspect, in a twenty-fifth possible implementation of the first aspect, the method further includes receiving, by the UE, an offset constant offset ($N_k$) corresponding to the first coverage enhancement level, where $N_k$ is the maximum repetition factor corresponding to the first coverage enhancement level; and the determining, by the UE, the repetition factor $N_1$ according to the maximum permissible transmit power, the constant, the uplink interference, the received power of the downlink pilot channel, and the transmit power of the downlink pilot channel includes determining, by the UE, the repetition factor $N_1$ according to the maximum permissible transmit power, the constant, the uplink interference, the received power of the downlink pilot channel, the transmit power of the downlink pilot channel, and the offset constant offset ($N_k$).

With reference to any one of the nineteenth possible implementation of the first aspect to the twenty-fifth possible implementation of the first aspect, in a twenty-sixth possible implementation of the first aspect, the first transmit power and the second transmit power are both the maximum permissible transmit power of the UE.

A second aspect of this application provides a preamble sequence sending apparatus, including a sending unit configured to send a first preamble sequence according to a first transmit power and using a repetition factor $N_1$; and a processing unit configured to, if no response message that is sent by a network-side device and that is corresponding to the first preamble sequence is received in a preset time period after the first preamble sequence is sent, switch to a next repetition factor $N_2$, where a quantity of consecutive sending times indicated by the next repetition factor $N_2$ is greater than a quantity of consecutive sending times indicated by the repetition factor $N_1$, where the sending unit is further configured to send a second preamble sequence according to a second transmit power and using the next repetition factor $N_2$.

With reference to the second aspect, in a first possible implementation of the second aspect, the processing unit is further configured to, before the sending unit sends the second preamble sequence according to the second transmit power and using the next repetition factor $N_2$, determine the second transmit power using the following formula:

$$P_{PRACH}1 = \min\{P_{MAX}, \text{PREAMBLE\_RECEIVED\_TARGET\_POWER1} + PL\}$$

where $$\text{PREAMBLE\_RECEIVED\_TARGET\_POWER1} = \\ \text{preambleInitialReceivedTargetPower+DEL-}\\\text{TA\_PREAMBLE+(PREAMBLE\_TRANSMIS-}\\\text{SION\_COUNTER-1)*(powerRampingStep)+}\\\text{delta}(N_{l+1}),$$

where $P_{PRACH}1$ is the second transmit power, min{ } is a MIN operation, $P_{MAX}$ is a maximum permissible transmit power of the UE, PL is an estimation value obtained by the UE by estimating a downlink path loss of a cell in which the UE is located, preambleInitialReceivedTargetPower is an initial target preamble received power, DELTA_PREAMBLE is a preamble sequence format offset value, PREAMBLE_TRANSMISSION_COUNTER is a preamble transmission counter, powerRampingStep is a power adjustment step, $N_{l+1}$ is the next repetition factor $N_2$, and delta ($N_{l+1}$) is a decreasing function of the next repetition factor $N_2$.

With reference to the second aspect or the first possible implementation of the second aspect, in a second possible implementation of the second aspect, the processing unit is configured to determine a third transmit power, where the third transmit power is greater than the first transmit power; and switch to the next repetition factor $N_2$ when the third transmit power exceeds the maximum permissible transmit power of the UE.

With reference to the second possible implementation of the second aspect, in a third possible implementation of the second aspect, the processing unit determines the third transmit power using the following formula:

$$P_{PRACH}2 = \min\{P_{MAX}, \text{PREAMBLE\_RECEIVED\_TARGET\_POWER2} + PL\},$$

where $$\text{PREAMBLE\_RECEIVED\_TARGET\_POWER2} = \\ \text{preambleInitialReceivedTargetPower+DEL-}\\\text{TA\_PREAMBLE+(PREAMBLE\_TRANSMIS-}\\\text{SION\_COUNTER-1)*(powerRampingStep)+}\\\text{delta}(N_l),$$

where $P_{PRACH}2$ is the third transmit power, min{ } is a MIN operation, $P_{MAX}$ is the maximum permissible transmit power of the UE, PL is the estimation value obtained by the UE by estimating the downlink path loss of the cell in which the UE is located, preambleInitialReceivedTargetPower is the initial target preamble received power, DELTA_PREAMBLE is the preamble sequence format offset value, PREAMBLE_TRANSMISSION_COUNTER is the preamble transmission counter, powerRampingStep is the power adjustment step, $N_l$ is the repetition factor $N_1$, and delta ($N_l$) is a decreasing function of the repetition factor $N_1$.

With reference to the second aspect, in a fourth possible implementation of the second aspect, the processing unit is further configured to, before the sending unit sends the second preamble sequence according to the second transmit power and using the next repetition factor $N_2$, determine the second transmit power using the following formula:

$$P_{PRACH}3 = \min\{P_{MAX}, \text{PREAMBLE\_RECEIVED\_TARGET\_POWER3} + PL + \text{delta}(N_{l+1})\},$$

where $P_{PRACH}3$ is the second transmit power, min{ } is a MIN operation, $P_{MAX}$ is a maximum permissible transmit power of the UE, PL is an estimation value obtained by the UE by estimating a downlink path loss of a cell in which the UE is located, PREAMBLE_RECEIVED_TARGET_POWER3 is a target preamble received power corresponding to the second preamble sequence, $N_{l+1}$ is the next repetition factor $N_2$, and delta ($N_{l+1}$) is a decreasing function of the next repetition factor $N_2$.

With reference to the fourth possible implementation of the second aspect, in a fifth possible implementation of the second aspect, the processing unit is further configured to, when the first preamble sequence is the first preamble sequence in a random access procedure, before the sending unit sends the first preamble sequence according to the first transmit power and using the repetition factor $N_1$, obtain a target preamble received power corresponding to the first preamble sequence; and determine the first transmit power according to the repetition factor $N_1$, the maximum permissible transmit power of the UE, the target preamble received power corresponding to the first preamble sequence, and the estimation value obtained by the UE by estimating the downlink path loss of the cell in which the UE is located.

With reference to the fifth possible implementation of the second aspect, in a sixth possible implementation of the second aspect, the processing unit determines the first transmit power using the following formula:

$$P_{PRACH}4 = \min\{P_{MAX}, \text{PREAMBLE\_RECEIVED\_TARGET\_POWER4} + PL + \text{delta}(N_l)\},$$

where $P_{PRACH}4$ is the first transmit power, $P_{MAX}$ is the maximum permissible transmit power of the UE, PREAMBLE_RECEIVED_TARGET_POWER is the target preamble received power corresponding to the first preamble sequence, $N_l$ is the repetition factor $N_1$, delta ($N_l$) is a decreasing function of the repetition factor $N_1$, min{ } is a MIN operation, and PL is the estimation value.

With reference to the third possible implementation of the second aspect or the fifth possible implementation of the second aspect, in a seventh possible implementation of the second aspect, delta ($N_1$) is $-10 \log (N_1)$ or $-10 \log (N_1)$+offset ($N_1$), and offset ($N_1$) is an offset constant corresponding to the repetition factor $N_1$.

With reference to the first possible implementation of the second aspect or the fourth possible implementation of the second aspect, in an eighth possible implementation of the second aspect, delta ($N_{l+1}$) is $-10 \log (N_{l+1})$ or $-10 \log (N_{l+1})$+offset ($N_{l+1}$), and offset ($N_{l+1}$) is an offset constant corresponding to the next repetition factor $N_2$.

With reference to the second aspect or the fourth possible implementation of the second aspect, in a ninth possible implementation of the second aspect, the processing unit is further configured to, when the first preamble sequence is the first preamble sequence in a random access procedure, obtain a target preamble received power corresponding to the first preamble sequence; obtain an offset constant offset ($N_1$) corresponding to the repetition factor $N_1$; and determine the first transmit power according to the maximum permissible transmit power of the UE, the target preamble received power corresponding to the first preamble sequence, the offset constant offset ($N_1$) corresponding to the repetition factor $N_1$, and the estimation value obtained by estimating the downlink path loss of the cell in which the UE is located.

With reference to the ninth possible implementation of the second aspect, in a tenth possible implementation of the second aspect, the processing unit determines the first transmit power using the following formula:

$$P_{PRACH}5=\min\{P_{MAX}, \text{PREAMBLE\_RECEIVED\_TARGET\_POWER5}+PL-10 \log(N_l)+\text{offset}(N_l)\},$$

where $P_{PRACH}5$ is the first transmit power, min{ } is a MIN operation, $P_{MAX}$ is the maximum permissible transmit power of the UE, PREAMBLE_RECEIVED_TARGET_POWER5 is the target preamble received power corresponding to the first preamble sequence, PL is the estimation value, and $N_l$ is the repetition factor $N_1$.

With reference to the second aspect or the first possible implementation of the second aspect to the tenth possible implementation of the second aspect, in an eleventh possible implementation of the second aspect, the processing unit is further configured to, before the sending unit sends the first preamble sequence according to the first transmit power and using the repetition factor $N_1$, obtain a group of sending information corresponding to the repetition factor $N_1$, where the sending information includes a preamble index and a PRACH resource; and the sending unit is configured to send, on the PRACH resource, according to the first transmit power and using the repetition factor $N_1$, the first preamble sequence corresponding to the preamble index.

With reference to the second aspect, in a twelfth possible implementation of the second aspect, the processing unit is configured to, before the sending unit sends the second preamble sequence according to the second transmit power and using the next repetition factor $N_2$, determine the second transmit power using the following formula:

$$p_{n+1} = p_n + \Delta P_0 + 10\log\left(\frac{N_l}{N_{l+1}}\right),$$

where $p_{n+1}$ is the second transmit power, $p_n$ is the first transmit power, $P_0$ is a power adjustment step, $N_l$ is the repetition factor $N_1$, and $N_{l+1}$ is the next repetition factor $N_2$.

With reference to the twelfth possible implementation of the second aspect, in a thirteenth possible implementation of the second aspect, the processing unit is further configured to, when the first preamble sequence is the first preamble sequence in a random access procedure, determine the first transmit power using the following formula:

Preamble_Initial_Power=CPICH_TX_Power−CPICH_RSCP+UL_interference+Constant_Value+delta($N_l$), where Preamble_Initial_Power is the first transmit power, CPICH_Tx_Power is a transmit power of a downlink pilot channel, CPICH_RSCP is a received power of the downlink pilot channel, UL_Interference is an uplink interference, Constant_Value is a constant, $N_l$ is the repetition factor $N_1$, and delta ($N_l$) is a decreasing function of the repetition factor $N_1$.

With reference to the thirteenth possible implementation of the second aspect, in a fourteenth possible implementation of the second aspect, delta ($N_1$) is $-10 \log (N_1)$ or $-10 \log (N_1)$+offset ($N_1$), and offset ($N_1$) is an offset constant corresponding to the repetition factor $N_1$.

With reference to any one of the fifth possible implementation of the second aspect to the fourteenth possible implementation of the second aspect, in a fifteenth possible implementation of the second aspect, the processing unit is configured to determine the third transmit power, where the third transmit power is greater than the first transmit power; and switch to the next repetition factor $N_2$ when the third transmit power exceeds the maximum permissible transmit power of the UE.

With reference to the second aspect or the first possible implementation of the second aspect to the fifteenth possible implementation of the second aspect, in a sixteenth possible implementation of the second aspect, the processing unit is further configured to, when the repetition factor $N_1$ is an initial repetition factor, before the sending unit sends the first preamble sequence according to the first transmit power and using the repetition factor $N_1$, determine preamble sequence powers separately corresponding to a first repetition factor and a second repetition factor; and determine that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum power of the UE and the specific constant, or when a preamble sequence power corresponding to the first repetition factor is less than a difference between the maximum permissible transmit power of the UE and a specific constant and a preamble sequence power corresponding to the second repetition factor is greater than or equal to the difference between the maximum power of the UE and the specific constant, where the second repetition factor is less than the first repetition factor and is adjacent to the first repetition factor among repetition factors.

With reference to the second aspect or the first possible implementation of the second aspect to the sixteenth possible implementation of the second aspect, in a seventeenth possible implementation of the second aspect, the repetition factor $N_1$ is corresponding to a first coverage enhancement level of the UE, the next repetition factor $N_2$ is corresponding to a second coverage enhancement level of the UE, and the second coverage enhancement level is higher than the first coverage enhancement level.

With reference to the second aspect or the first possible implementation of the second aspect to the sixteenth possible implementation of the second aspect, in an eighteenth possible implementation of the second aspect, the processing unit is further configured to obtain the next repetition factor $N_2$ by adding a repetition factor step to the repetition factor $N_1$, where the repetition factor $N_1$ is corresponding to a first coverage enhancement level of the UE; when the next repetition factor $N_2$ is less than or equal to a maximum repetition factor corresponding to the first coverage enhancement level, the next repetition factor $N_2$ is corresponding to the first coverage enhancement level; when the next repetition factor $N_2$ is greater than the maximum repetition factor, the next repetition factor $N_2$ is corresponding to a second coverage enhancement level of the UE; and the second coverage enhancement level is higher than the first coverage enhancement level.

With reference to the eighteenth possible implementation of the second aspect, in a nineteenth possible implementation of the second aspect, the processing unit is further configured to, when the repetition factor $N_1$ is the initial repetition factor, receive the target preamble received power corresponding to the first preamble sequence; and determine the repetition factor $N_1$ according to the target preamble received power, the maximum permissible transmit power of the UE, and the estimation value obtained by the UE by estimating the downlink path loss of the cell in which the UE is located.

With reference to the nineteenth possible implementation of the second aspect, in a twentieth possible implementation of the second aspect, the processing unit determines the repetition factor $N_1$ using the following formula:

$$\text{Preamble\_Initial\_Repetition\_Number} = \text{Ceil}\left(10^{\frac{PREAMBLE\_RECEIVED\_TARGET\_POWER+PL-P_{MAX}}{10}}\right),$$

where Preamble_Initial_Repetition_Number is the repetition factor $N_1$, Ceil( ) is a round-up function, PREAMBLE_RECEIVED_TARGET_POWER is the target preamble received power, PL is the estimation value, and $P_{MAX}$ is the maximum permissible transmit power.

With reference to the nineteenth possible implementation of the second aspect, in a twenty-first possible implementation of the second aspect, the apparatus further includes a receiving unit configured to receive an offset constant offset $(N_k)$ corresponding to the first coverage enhancement level, where $N_k$ is the maximum repetition factor corresponding to the first coverage enhancement level; and the processing unit is further configured to determine the repetition factor $N_1$ according to the target preamble received power, the offset constant offset $(N_k)$, the maximum permissible transmit power of the UE, and the estimation value obtained by the UE by estimating the downlink path loss of the cell in which the UE is located.

With reference to the eighteenth possible implementation of the second aspect, in a twenty-second possible implementation of the second aspect, the apparatus further includes a receiving unit configured to, when the repetition factor $N_1$ is the initial repetition factor, receive the maximum permissible transmit power of the UE, the constant, and the uplink interference; and the processing unit is further configured to obtain the received power of the downlink pilot channel by means of measurement; obtain the transmit power of the downlink pilot channel; and determine the repetition factor $N_1$ according to the maximum permissible transmit power, the constant, the uplink interference, the received power of the downlink pilot channel, and the transmit power of the downlink pilot channel.

With reference to the twenty-second possible implementation of the second aspect, in a twenty-third possible implementation of the second aspect, the processing unit determines the repetition factor $N_1$ using the following formula:

$$\text{Preamble\_Initial\_Repetition\_Number} = \text{Ceil}\left(10^{\frac{CPICH\_TX\_Power-CPICH\_RSCP+UL\_Interference+Constant\_Value-Maximum\_Allowed\_Power}{10}}\right),$$

where Preamble_Initial_Repetition_Number is the repetition factor $N_1$, Ceil( ) is a round-up function, Maximum_Allowed_Power is the maximum permissible transmit power, CPICH_RSCP is the received power of the downlink pilot channel, CPICH_Tx_Power is the transmit power of the downlink pilot channel, UL_Interference is the uplink interference, and Constant_Value is the constant.

With reference to the twenty-second possible implementation of the second aspect, in a twenty-fourth possible implementation of the second aspect, the receiving unit is further configured to receive an offset constant offset $(N_k)$ corresponding to the first coverage enhancement level, where $N_k$ is the maximum repetition factor corresponding to the first coverage enhancement level; and the processing unit is further configured to determine the repetition factor $N_1$ according to the maximum permissible transmit power, the constant, the uplink interference, the received power of the downlink pilot channel, the transmit power of the downlink pilot channel, and the offset constant offset $(N_k)$.

With reference to any one of the eighteenth possible implementation of the second aspect to the twenty-fourth possible implementation of the second aspect, in a twenty-fifth possible implementation of the second aspect, the first transmit power and the second transmit power are both the maximum permissible transmit power of the UE.

With reference to the second aspect or any one of the first possible implementation of the second aspect to the twenty-fifth possible implementation of the second aspect, in a twenty-sixth possible implementation of the second aspect, the apparatus is UE.

One or more technical solutions provided in the embodiments of this application at least have the following technical effects or advantages.

In the embodiments of this application, first, when a preamble sequence is sent, time domain repetition is performed in a form of a repetition factor, and therefore, a transmission success rate of the preamble sequence can be improved. Further, when no response message corresponding to the sent preamble sequence is received, the repetition factor is increased. This can further improve a signal coverage area, thereby improving the transmission success rate of the preamble sequence. Compared with a method of increasing a transmit power in the prior art, the method in the embodiments of this application is more effective and practical because there is no increase bottleneck such as a maximum permissible transmit power.

DESCRIPTION OF EMBODIMENTS

Embodiments of this application provide a preamble sequence sending method and apparatus, so as to resolve a technical problem in the prior art that a low transmission success rate is caused when a transmit power is increased to retransmit a preamble sequence.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

This specification describes various aspects with reference to user equipment.

The user equipment may be a wireless terminal or a wired terminal. The wireless terminal may be a device that provides a user with voice and/or data connectivity, a handheld device having a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) or a computer having a mobile terminal, for example, may be a portable, pocket-sized, handheld, computer built-in, or in-vehicle mobile apparatus, for exchanging voice and/or data with the radio access network. For example, the wireless terminal may be a device such as a personal communication service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

To make the objectives, technical solutions, and advantages of the embodiments of this application clearer, the following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application without creative efforts shall fall within the protection scope of this application.

Figure 1:
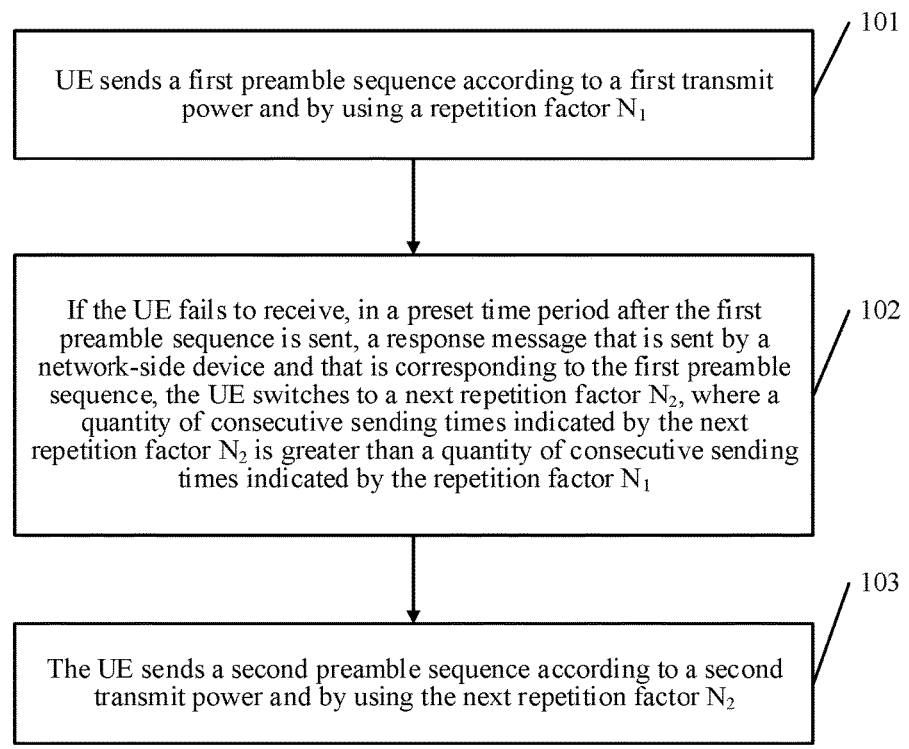
FIG. 1 is a flowchart of a preamble sequence sending method according to an embodiment of this application.

Referring to FIG. 1, FIG. 1 is a flowchart of a preamble sequence sending method according to an embodiment of this application. As shown in FIG. 1, the method includes the following content.

Step 101: UE sends a first preamble sequence according to a first transmit power and using a repetition factor $N_1$.

Step 102: If the UE fails to receive, in a preset time period after the first preamble sequence is sent, a response message that is sent by a network-side device and that is corresponding to the first preamble sequence, the UE switches to a next repetition factor $N_2$, where a quantity of consecutive sending times indicated by the next repetition factor $N_2$ is greater than a quantity of consecutive sending times indicated by the repetition factor $N_1$.

Step 103: The UE sends a second preamble sequence according to a second transmit power and using the next repetition factor $N_2$.

It is assumed that, before step 101, a higher-layer request triggers a physical layer of the UE to send a preamble, where the request includes a preamble index, a target preamble received power, a corresponding RA-RNTI, and PRACH resource information. Then, the UE selects a preamble sequence from a preamble sequence set using the preamble index. Then, the UE performs step 101, that is, sends the selected preamble sequence on an indicated PRACH resource according to the first transmit power and using the repetition factor $N_1$ and using the selected preamble sequence.

Next, if the UE fails to receive, in the preset time period after the first preamble sequence is sent, the response message that is sent by the network-side device and that is corresponding to the first preamble sequence, the UE performs step 102.

Optionally, in step 101, the first preamble sequence is sent, and a timer is enabled. Therefore, the UE may determine, according to whether the timer expires, whether the preset time period is exceeded. In practice, another manner may also be used to determine whether the preset time period is exceeded. This part of content is content well known to a person skilled in the art. Therefore, details are not described herein again.

The case in which the UE fails to receive, in the preset time period, the response message that is sent by the network-side device and that is corresponding to the first preamble sequence is, for example, the second or third case described in the background. Certainly, in practice, the case may also be another case in which no response message corresponding to the first preamble sequence is received. This application does not impose a specific limitation.

In step 102, that the UE switches to a next repetition factor $N_2$ is increasing a quantity of consecutive sending times of a preamble sequence to $N_2$. For example, it is assumed that, in step 101, the first preamble sequence is sent using a repetition factor 3. In other words, the first preamble sequence is repeatedly sent in a time domain, that is, is sent for three consecutive times. Then, in step 102, the UE switches to a repetition factor 4. Then, in step 103, the second preamble sequence is sent according to the second power and using the repetition factor 4. In other words, the second preamble sequence is repeatedly sent in a time domain and is sent for four consecutive times, so as to improve a transmission success rate of the preamble sequence.

The first transmit power and the second transmit power may be the same or may be different. Details are described in the following.

It can be seen from the foregoing descriptions that, compared with the prior art in which a transmission success rate of a preamble sequence is improved merely by increasing a transmit power, the method in this embodiment of this application is more effective. According to the method in this embodiment of this application, repeated transmission is performed in a time domain, and a quantity of consecutive sending times in the time domain is increased when no response message is received, so as to improve a transmission success rate of a preamble sequence. The method of increasing a transmit power is limited by a maximum permissible transmit power of UE and has an increase bottleneck, and therefore has a limited effect.

Further, for machine type communication (MTC) UE deployed in a basement, a high building, a remote area, or the like, there is a relatively large path loss. Therefore, a preamble sequence is sent using the method in this embodiment of this application, so that a combined gain of a signal is obtained on a receiving side, thereby improving the transmission success rate of the preamble sequence. Therefore, the method in this embodiment of this application has a more obvious effect in such a scenario.

Further, for example, in a scenario with limited coverage, such as the foregoing described basement, coverage enhancement (CE) can be performed. A CE level is a different coverage enhancement level obtained by classification after coverage enhancement is performed relative to normal coverage. For example, if a maximum coupling loss corresponding to the normal coverage is 147 dB, a corresponding maximum coupling loss after the coverage enhancement is performed is 147+15=162 dB, and is enhanced by 15 dB relative to the normal coverage. A coverage enhancement degree may be further classified. An enhancement of 5 dB is corresponding to a coverage enhancement level. An enhancement of 10 dB is corresponding to a next coverage level. An enhancement of 15 dB is corresponding to a maximum coverage level. Different repetition factors may be used to achieve different coverage enhancement degrees. Therefore, a cell may be divided into different CE levels. Each CE level is corresponding to a different channel/signal repetition factor. For details, refer to FIG. 2. A cell of specific UE is divided into three CE levels, which are a CE level 0, a CE level 1, and a CE level 2. The CE level 0 is corresponding to a repetition factor $C_0$. The CE level 1 is corresponding to a repetition factor $C_1$. The CE level 2 is corresponding to a repetition factor $C_2$.

If there is a CE level, optionally, the repetition factor $N_1$ in step 101 is corresponding to a first CE level of the UE, the next repetition factor $N_2$ is corresponding to a second CE level of the UE, and the second CE level is higher than the first CE level. In other words, in step 102, that the UE switches to a next repetition factor $N_2$ indicates that the UE switches to the second CE level. Because the repetition factor $N_1$ corresponding to the first CE level cannot meet a coverage requirement, the UE needs to switch to a higher CE level.

Further, in an embodiment, step 102 includes determining, by the UE, a third transmit power; and when it is determined that the third transmit power exceeds a maximum permissible transmit power of the UE, switching to the next repetition factor $N_2$, where the third transmit power is greater than the first transmit power.

When the UE fails to receive the response message corresponding to the first preamble sequence, the UE first determines the third transmit power, where the third transmit power is a power obtained after the first transmit power is increased. Then, the UE determines whether the third transmit power exceeds the maximum permissible transmit power of the UE. If the third transmit power exceeds the maximum permissible transmit power of the UE, the UE performs step 102, determines the second transmit power corresponding to the next repetition factor $N_2$, and then performs step 103. If the third transmit power does not exceed the maximum permissible transmit power of the UE, the UE sends a third preamble sequence according to the third transmit power and using the repetition factor $N_1$. In other words, in the solution of this embodiment, a transmit power is first increased at a same repetition factor. When an increased transmit power exceeds the maximum permissible transmit power of the UE, the repetition factor is increased. In addition, the transmit power is increased again based on an increased repetition factor, and so on.

Figure 3:
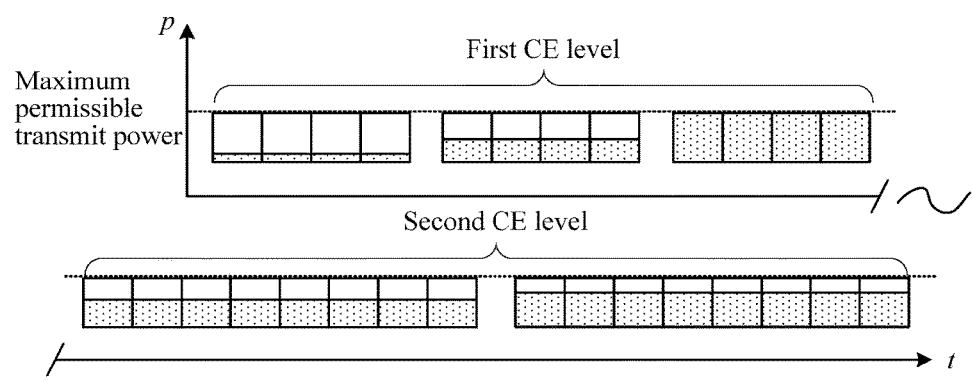
FIG. 3 is a schematic diagram of sending a preamble sequence according to an embodiment of this application.

For example, referring to FIG. 3, FIG. 3 is a schematic diagram of sending a preamble sequence according to this embodiment. A horizontal coordinate axis indicates a time t, and a vertical coordinate axis indicates a transmit power p. A dashed line parallel to the horizontal coordinate axis indicates the maximum permissible transmit power of the UE. At the first CE level, a corresponding repetition factor is 4. In addition, at the first CE level, a total of three groups of preamble sequences are sent. In a group on the left in FIG. 3, four square boxes indicate the repetition factor 4, a shadow part indicates a transmit power used for sending a first group of preamble sequence. Because no response message is received, a second group, that is, a group in the middle, is sent. Four square boxes still indicate the repetition factor 4, that is, the second group of preamble sequence is still sent using the repetition factor 4, but the transmit power is increased. Similarly, when a third group is sent, the repetition factor is still 4, but the transmit power is increased to the maximum permissible transmit power of the UE. Therefore, the UE sends the preamble sequence according to the maximum permissible transmit power and using the repetition factor 4. When still no response message is received in a preset time period after the third group is sent, the transmit power is increased again based on the transmit power of the third group. As a result, an increased transmit power exceeds the maximum transmit power of the UE. Then, the CE level needs to be switched. For example, the CE level is switched to the second CE level. At the second CE level, a corresponding repetition factor is 8. The UE determines an initial transmit power corresponding to the repetition factor 8, as shown in a group on the left in FIG. 3. Then, the UE sends a preamble sequence again according to the initial transmit power and using the repetition factor 8. If still no response message is received, the transmit power is increased. Because an increased transmit power is less than the maximum permissible transmit power of the UE, the UE sends a preamble sequence again according to the increased transmit power and using the repetition factor 8, and so on, till a response message corresponding to a sent preamble sequence is received in the preset time period after the preamble sequence is sent.

Next, the following describes how to determine the first transmit power when the first preamble sequence is the first preamble sequence in a random access procedure.

A first possible implementation is obtaining, by the UE, a target preamble received power corresponding to the first preamble sequence; and determining, by the UE, the first transmit power according to the maximum permissible transmit power of the UE, the target preamble received power corresponding to the first preamble sequence, and an estimation value obtained by the UE by estimating a downlink path loss of a cell in which the UE is located.

For example, the first transmit power may be determined using a formula (1):

$$P_{PRACH}6=\min\{P_{MAX}, \text{PREAMBLE\_RECEIVED\_TARGET\_POWER}6+PL\} \quad (1),$$

where $P_{PRACH}6$ is the first transmit power, min{ } is a MIN operation, $P_{MAX}$ is the maximum permissible transmit power, PREAMBLE_RECEIVED_TARGET_POWER6 is the target preamble received power corresponding to the first preamble sequence, and PL is the estimation value.

In practice, the physical layer of the UE sends $P_{MAX}$ and PL to a MAC layer. The MAC layer calculates $P_{PRACH}6$ according to the formula (1) and delivers $P_{PRACH}6$ to the physical layer. Alternatively, a MAC layer delivers PREAMBLE_RECEIVED_TARGET_POWER6 to the physical layer, and the physical layer calculates $P_{PRACH}6$ according to the formula (1).

Optionally, the third transmit power may be determined using a formula (2) and a formula (3):

$$P_{PRACH}2 = \min\{P_{MAX}, \text{PREAMBLE\_RECEIVED\_TARGET\_POWER2} + PL\} \quad (2),$$

where $$\text{PREAMBLE\_RECEIVED\_TARGET\_POWER2} = \text{preambleInitialReceivedTargetPower} + \text{DELTA\_PREAMBLE} + (\text{PREAMBLE\_TRANSMISSION\_COUNTER} - 1)*(\text{powerRampingStep}) + \text{delta}(N_l) \quad (3),$$

where $P_{PRACH}2$ is the third transmit power, preambleInitialReceivedTargetPower is an initial target preamble received power, DELTA_PREAMBLE is a preamble sequence format offset value, PREAMBLE_TRANSMISSION_COUNTER is a preamble transmission counter, powerRampingStep is a power adjustment step, $N_l$ is the repetition factor $N_1$, delta ($N_l$) is a decreasing function of the repetition factor $N_1$, and meanings of other parameters are the same as those of the same parameters in the formula (1).

PreambleInitialReceivedTargetPower and powerRampingStep source form broadcast information sent by a network side. DELTA_PREAMBLE is a protocol-specified value. PREAMBLE_TRANSMISSION_COUNTER can be obtained according to a current counter value.

Delta ($N_1$) is $-10 \log (N_1)$ or $-10 \log (N_1) + \text{offset} (N_1)$, and offset ($N_1$) is an offset constant corresponding to the repetition factor $N_1$. In this embodiment, when a transmit power is increased from the first transmit power to the third transmit power, delta ($N_1$) is introduced to determine the third transmit power obtained after the increase. A diversity gain obtained because of $N_l$ times of repeated transmission is considered.

Optionally, before step 103, the second transmit power corresponding to the next repetition factor $N_2$ may be determined using a formula (4) and a formula (5):

$$P_{PRACH}1 = \min\{P_{MAX}, \text{PREAMBLE\_RECEIVED\_TARGET\_POWER1} + PL\} \quad (4),$$

where $$\text{PREAMBLE\_RECEIVED\_TARGET\_POWER1} = \text{preambleInitialReceivedTargetPower} + \text{DELTA\_PREAMBLE} + (\text{PREAMBLE\_TRANSMISSION\_COUNTER} - 1)*(\text{powerRampingStep}) + \text{delta}(N_{l+1}) \quad (5),$$

where $P_{PRACH}1$ is the second transmit power, $N_{l+1}$ is the next repetition factor $N_2$, delta ($N_{l+1}$) is a decreasing function of the next repetition factor $N_2$, and meanings of other parameters are the same as those of the same parameters in the formula (1) and the formula (3).

Delta ($N_{l+1}$) is $-10 \log (N_{l+1})$ or $-10 \log (N_{l+1}) + \text{offset} (N_{l+1})$, and offset ($N_{l+1}$) is an offset constant corresponding to the next repetition factor $N_2$.

In other words, when a CE level is switched, an initial transmit power corresponding to a CE level obtained after switching may be calculated according to the formulas (4) and (5). A difference lies in that $N_{l+1}$ indicates a repetition factor corresponding to the CE level obtained after switching.

A second possible implementation of determining the first transmit power is further determining, by the UE, the first transmit power according to the repetition factor $N_1$ based on the first possible implementation.

The first transmit power may be determined using a formula (6):

$$P_{PRACH}4 = \min\{P_{MAX}, \text{PREAMBLE\_RECEIVED\_TARGET\_POWER4} + PL + \text{delta}(N_l)\} \quad (6),$$

where $P_{PRACH}4$ is the first transmit power, PREAMBLE_RECEIVED_TARGET_POWER4 is the target preamble received power corresponding to the first preamble sequence, and meanings of other parameters are the same as those of the foregoing same parameters.

Similarly, after the UE switches to the next repetition factor $N_2$ in step 102, calculating an initial transmit power corresponding to the next repetition factor $N_2$, that is, the second transmit power, is analogous to the formula (6). A difference lies in that delta ($N_l$) in the formula (6) is replaced with delta ($N_{l+1}$), and PREAMBLE_RECEIVED_TARGET_POWER4 is replaced with PREAMBLE_RECEIVED_TARGET_POWER3. PREAMBLE_RECEIVED_TARGET_POWER3 indicates a target preamble received power corresponding to the second preamble sequence. In addition, $P_{PRACH}3$ indicates the second transmit power.

Further, if the third transmit power is obtained by means of a power increase based on the first transmit power, PREAMBLE_RECEIVED_TARGET_POWER4 in the formula (6) may be directly updated. After the update, PREAMBLE_RECEIVED_TARGET_POWER4 is preambleInitialReceivedTargetPower+DELTA_PREAMBLE+PREAMBLE_TRANSMISSION_COUNTER-1)*powerRampingStep. Meanings of parameters are the same as those of the foregoing same parameters.

Similarly, if a power increase is performed based on the second transmit power, an increase method is similar to that of the third transmit power. For brevity of the specification, details are not described herein again.

A third possible implementation of determining the first transmit power is obtaining, by the UE, a target preamble received power corresponding to the first preamble sequence; receiving, by the UE, an offset constant offset ($N_1$) corresponding to the repetition factor $N_1$; and determining, by the UE, the first transmit power according to the maximum permissible transmit power of the UE, the target preamble received power corresponding to the first preamble sequence, the offset constant offset ($N_1$), and an estimation value obtained by the UE by estimating a downlink path loss of a cell in which the UE is located.

The first transmit power may be determined using a formula (7):

$$P_{PRACH}5 = \min\{P_{MAX}, \text{PREAMBLE\_RECEIVED\_TARGET\_POWER5} + PL - 10 \log(N_1) + \text{offset}(N_1)\} \quad (7),$$

where $P_{PRACH}5$ indicates the first transmit power, and meanings of other parameters are the same as those of the foregoing same parameters.

A fourth possible implementation of determining the first transmit power is obtaining, by the UE, a transmit power CPICH_Tx_Power of a downlink pilot channel, a received power CPICH_RSCP of the downlink pilot channel, an uplink interference UL_interference, and a constant Constant_value; and determining, by the UE, the first transmit power according to the transmit power CPICH_Tx_Power of the downlink pilot channel, the received power CPICH_RSCP of the downlink pilot channel, the uplink interference UL_interference, the constant Constant_value, and the repetition factor $N_1$. CPICH_RSCP is obtained by the UE by means of measurement. CPICH_Tx_Power, UL_interference, and Constant_value may be sent by a network to the UE using a broadcast channel. The uplink interference indicates a value of an interference on uplink transmission of the UE, where the interference is caused by uplink transmission of UE outside the cell in which the UE is located.

The first transmit power may be determined using a formula (8):

$$\text{Preamble\_Initial\_Power} = \text{CPICH\_TX\_Power} - \text{CPICH\_RSCP} + \text{UL\_interference} + \text{Constant\_Value} + \text{delta}(N_l) \quad (8),$$

where Preamble_Initial_Power is the first transmit power, $N_l$ is the repetition factor $N_1$, delta $(N_l)$ is a decreasing function of the repetition factor $N_1$, delta $(N_1)$ is $-10 \log (N_1)$ or $-10 \log (N_1) + \text{offset}(N_1)$, and offset $(N_1)$ is an offset constant corresponding to the repetition factor $N_1$.

Optionally, before step 103, the UE may further determine the second transmit power using a formula (9):

$$p_{n+1} = p_n + \Delta P_0 + 10\log\left(\frac{N_l}{N_{l+1}}\right), \quad (9)$$

where $p_{n+1}$ is the second transmit power, $p_n$ is the first transmit power, $P_0$ is a power adjustment step, $N_l$ is the repetition factor $N_1$, and $N_{l+1}$ is the next repetition factor $N_2$.

Further, the first transmit power plus $P_0$ is the third transmit power.

Certainly, in practice, a form of a formula for determining the second transmit power is not limited to the formula (9). Various variations of the formula (9) also belong to the protection scope of this application. For example, $$p_{n+1} = \frac{\overline{p}_{n+1} N_l}{N_{l+1}}.$$

$\overline{p}_{n+1}$ is obtained after the power adjustment step is added to the first transmit power. A value of $\overline{p}_{n+1}$ may be greater than the maximum permissible transmit power of the UE.

Next, the following describes how to determine the repetition factor $N_1$ when the repetition factor $N_1$ is an initial repetition factor after the higher-layer request triggers preamble sequence transmission.

A first possible manner is estimating, by the UE, a CE level of the UE according to a downlink signal measurement result; and then determining that a repetition factor corresponding to the CE level is the repetition factor $N_1$. A correspondence between a CE level and a repetition factor corresponding to the CE level may be obtained by means of cell broadcast.

A second possible manner is determining, by the UE, preamble sequence powers separately corresponding to a first repetition factor and a second repetition factor; and determining that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum power of the UE and the specific constant, or when a preamble sequence power corresponding to the first repetition factor is less than a difference between the maximum permissible transmit power of the UE and a specific constant and a preamble sequence power corresponding to the second repetition factor is greater than or equal to the difference between the maximum power of the UE and the specific constant. The second repetition factor is less than the first repetition factor and is adjacent to the first repetition factor among repetition factors.

Figure 2:
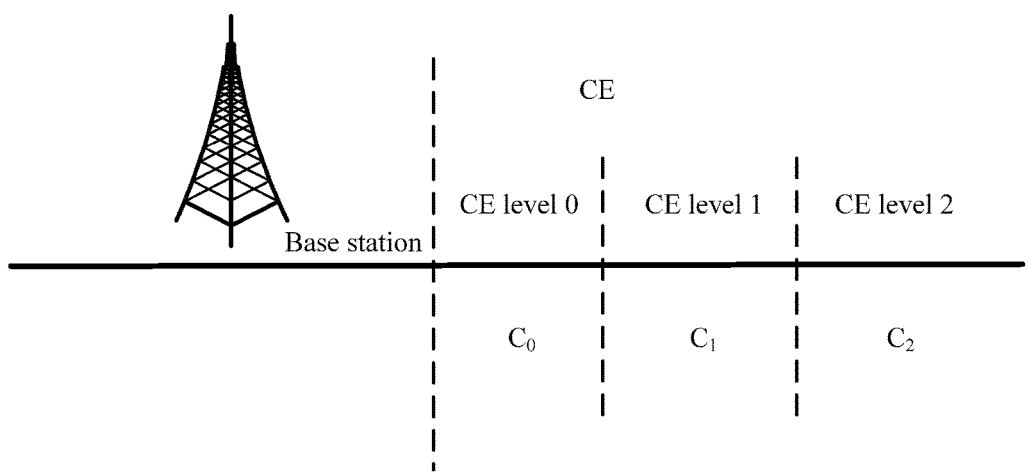
FIG. 2 is a schematic diagram of a coverage enhancement level according to an embodiment of this application.

For example, still referring to FIG. 2, it is assumed that there are three CE levels, separately corresponding to a repetition factor $C_0$, a repetition factor $C_1$, and a repetition factor $C_2$. The repetition factor $C_2$ is greater than the repetition factor $C_1$, and the repetition factor $C_1$ is greater than the repetition factor $C_0$. The UE may calculate a preamble sequence power of each repetition factor according to a formula (10):

$$P_{PRACH}(C_i) = \text{PREAMBLE\_RECEIVED\_TARGET\_POWER} + PL + \text{delta}(C_i) \quad (10),$$

where i is 0, 1, or 2, $P_{PRACH}(C_i)$ is the preamble sequence power of each repetition factor, meanings of other parameters are the same as those of the foregoing same parameters, and delta $(C_i)$ is, for example, a decreasing function of the repetition factor $C_i$.

If $P_{PRACH}(C_i) < (P_{MAX} - \text{positive\_constant})$ and $P_{PRACH}(C_{i-1}) > (P_{MAX} - \text{positive\_constant})$, the repetition factor $C_i$ is the repetition factor $N_1$, where positive_constant is a specific constant.

Optionally, after the UE determines the repetition factor $N_1$, the physical layer further reports the repetition factor $N_1$ to the MAC layer. The UE receives a group of sending information that is corresponding to the repetition factor $N_1$ and that is delivered by the MAC layer. The sending information includes, for example, a preamble index, a target preamble received power, a corresponding RA-RNTI, and PRACH resource information.

Optionally, the UE may further receive sending information that is corresponding to each repetition factor and that is delivered by the MAC layer. After the UE determines the repetition factor $N_1$, the UE selects, according to the repetition factor $N_1$, a group of sending information corresponding to the repetition factor $N_1$.

Therefore, further, step 101 includes sending, by the UE on the PRACH resource corresponding to the repetition factor $N_1$ and using the first preamble sequence selected according to the preamble index, the selected first preamble sequence according to the first transmit power and using the repetition factor $N_1$.

Similarly, in step 102, after the UE switches to the next repetition factor $N_2$, a group of sending information corresponding to the next repetition factor $N_2$ may also be obtained using the foregoing two manners. Therefore, in step 103, the second preamble sequence may be sent according to the group of sending information corresponding to the next repetition factor $N_2$.

The foregoing parts describe various implementations of the method, as shown in FIG. 3, of both switching a repetition factor and increasing a transmit power. Next, a detailed implementation procedure of a preamble sequence sending method in which a repetition factor is increased is described.

Before step 102, the UE adds a repetition factor step to the repetition factor $N_1$ to obtain the next repetition factor $N_2$. Provided that the repetition factor $N_1$ is corresponding to the first CE level of the UE, there are two cases. One case is, when the next repetition factor $N_2$ is less than or equal to a maximum repetition factor corresponding to the first CE level, the next repetition factor $N_2$ is still corresponding to the first CE level. The other case is, when the next repetition factor $N_2$ is greater than a maximum repetition factor, the next repetition factor $N_2$ is corresponding to the second CE level of the UE, and the second CE level is higher than the first CE level. In other words, a repetition factor is increased for the UE within a maximum repetition factor corresponding to a CE level. Then, the UE switches to a next CE level when an increased repetition factor exceeds the maximum repetition factor corresponding to the CE level. The first transmit power and the second transmit power may be the same, for example, may be a power value less than or equal to the maximum permissible transmit power of the UE. Alternatively, the first transmit power and the second transmit power may be different. For example, the first transmit power is less than the maximum permissible transmit power of the UE, and the second transmit power is the maximum permissible transmit power of the UE.

Figure 4:
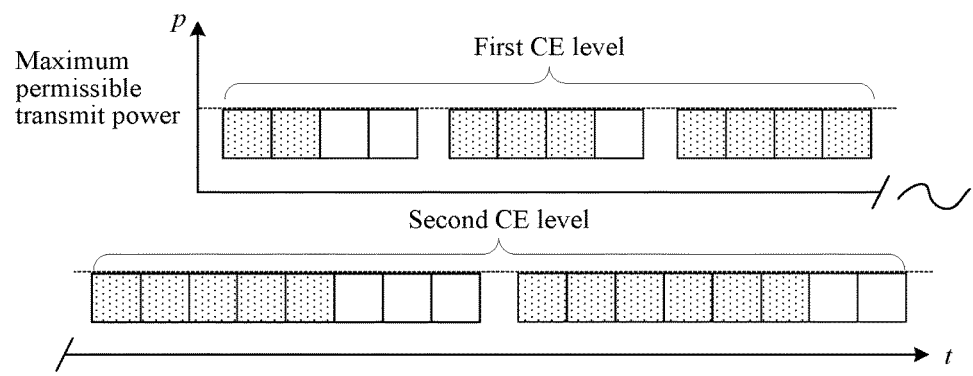
FIG. 4 is another schematic diagram of sending a preamble sequence according to an embodiment of this application.

For example, referring to FIG. 4, FIG. 4 is another schematic diagram of sending a preamble sequence according to an embodiment of this application. Parts that are the same as those in FIG. 3 are no longer described. A difference from FIG. 3 and the embodiment of FIG. 3 lies in that UE sends a preamble sequence using a maximum transmit power of the UE each time. In addition, a shadow part indicates a repetition factor used each time. For example, in first transmission, a used repetition factor is 2. Then, because no corresponding response message is received, a repetition factor step, such as 1, is added based on the repetition factor 2, to obtain a repetition factor 3. Because the repetition factor 3 does not exceed a maximum repetition factor 4 corresponding to a first CE level, the UE is currently still at the first CE level. After a preamble sequence is sent using the repetition factor 4, if no corresponding response message is received, a repetition factor step 1 is added again based on the repetition factor 4, to obtain a next repetition factor 5. Because the next repetition factor 5 exceeds the maximum repetition factor 4 corresponding to the first CE level, in this case, the next repetition factor 5 is corresponding to a second CE level, that is, the UE switches the CE level. Then, the UE sends a preamble sequence according to the maximum permissible transmit power and using the repetition factor 5.

Next, the following describes how to determine the repetition factor $N_1$ when the repetition factor $N_1$ is the initial repetition factor.

A first possible implementation is receiving, by the UE, the target preamble received power corresponding to the first preamble sequence; and determining, by the UE, the repetition factor $N_1$ according to the target preamble received power, the maximum permissible transmit power of the UE, and the estimation value obtained by the UE by estimating the downlink path loss of the cell in which the UE is located.

The repetition factor $N_1$ may be determined using a formula (11):

$$\text{Preamble\_Initial\_Repetition\_Number} = \text{Ceil}\left(10^{\frac{PREAMBLE\_RECEIVED\_TARGET\_POWER+PL-P_{MAX}}{10}}\right), \quad (11)$$

where Preamble_Initial_Repetition_Number is the repetition factor $N_1$, Ceil( ) is a round-up function, PREAMBLE_RECEIVED_TARGET_POWER is the target preamble received power corresponding to the first preamble sequence, PL is the estimation value, and $P_{MAX}$ is the maximum permissible transmit power.

A second possible implementation is, based on the first possible implementation, the method further includes receiving, by the UE, an offset constant offset ($N_k$) corresponding to the first CE level; and determining, by the UE, the repetition factor $N_1$ according to the target preamble received power, the offset constant offset ($N_k$), the maximum permissible transmit power of the UE, and the estimation value obtained by the UE by estimating the downlink path loss of the cell in which the UE is located. $N_k$ is the maximum repetition factor corresponding to the first CE level.

The repetition factor $N_1$ may be determined using a formula (12):

$$\text{Preamble\_Initial\_Repetition\_Number} = \text{Ceil}\left(10^{\frac{PREAMBLE\_RECEIVED\_TARGET\_POWER+PL-P_{MAX}}{10}}\right) + \text{offset}(N_k), \quad (12)$$

where meanings of parameters in the formula (12) are the same as those of the same parameters in the formula (11), and details are not described herein again.

A third possible implementation is receiving, by the UE, the maximum permissible transmit power of the UE, the constant, and the uplink interference; obtaining, by the UE, the received power of the downlink pilot channel by means of measurement; obtaining, by the UE, the transmit power of the downlink pilot channel; and determining, by the UE, the repetition factor $N_1$ according to the maximum permissible transmit power, the constant, the uplink interference, the received power of the downlink pilot channel, and the transmit power of the downlink pilot channel.

The repetition factor $N_1$ may be determined using a formula (13):

$$\text{Preamble\_Initial\_Repetition\_Number} = \text{Ceil}\left(10^{\frac{CPICH\_TX\_Power-CPICH\_RSCP+UL\_Interference + Constant\_Value-Maximum\_Allowed\_Power}{10}}\right), \quad (13)$$

where Preamble_Initial_Repetition_Number is the repetition factor $N_1$, Ceil( ) is a round-up function, Maximum_Allowed_Power is the maximum permissible transmit power, CPICH_RSCP is the received power of the downlink pilot channel, CPICH_Tx_Power is the transmit power of the downlink pilot channel, UL_Interference is the uplink interference, and Constant_Value is the constant.

A fourth possible implementation is, based on the third possible implementation, the method further includes receiving, by the UE, an offset constant offset ($N_k$) corresponding to the first CE level; and determining, by the UE, the repetition factor $N_1$ according to the maximum permissible transmit power, the constant, the uplink interference, the received power of the downlink pilot channel, the transmit power of the downlink pilot channel, and the offset constant offset ($N_1$). $N_k$ is the maximum repetition factor corresponding to the first CE level.

The repetition factor $N_1$ may be determined using a formula (14):

$$\text{Preamble\_Initial\_Repetition\_Number} = \text{Ceil}\left(10^{\frac{CPICH\_TX\_Power-CPICH\_RSCP+UL\_Interference + Constant\_Value-Maximum\_Allowed\_Power}{10}}\right) + \text{offset }(N_k), \quad (14)$$

where meanings of parameters in the formula (14) are the same as those of the same parameters in the formula (13), and details are not described herein again.

Several specific examples are provided in the following to describe a specific implementation procedure of the preamble sequence sending method in this embodiment of this application.

A first example is a first possible implementation procedure based on an LTE system. The method includes the following content.

Step 1: UE receives cell broadcast of a serving cell c in which the UE is located. The cell broadcast includes multiple CE levels and a physical channel/signal repetition factor corresponding to each CE level. Received quality of a downlink pilot channel may be segmented and mapped onto multiple CE levels, and separately correspond to different channel/signal repetition factors. Each CE level is corresponding to a repetition factor.

Step 2: The UE estimates a CE level of the UE according to measurement of a downlink signal. It is assumed that the CE level of the UE is a first CE level. Then, a channel/signal repetition factor $N_1$ corresponding to the first CE level is determined.

Step 3: The UE reports the repetition factor $N_1$ to a MAC layer, and receives a group of sending information that is corresponding to the repetition factor $N_1$ and that is sent by the MAC layer. The sending information includes a preamble index, a target preamble received power (PREAMBLE_RECEIVED_TARGET_POWER), a corresponding RA-RNTI, and PRACH resource information.

Step 4: The UE determines a first transmit power. In this embodiment, the UE sends a preamble sequence for the first time. Therefore, the first transmit power is an initial transmit power at the first CE level. The first transmit power $P_{PRACH} = \min\{P_{CMAX,c}(i), \text{PREAMBLE\_RECEIVED\_TARGET\_POWER}+PL_c+\text{delta }(N_l)\}$. $P_{CMAX,c}(i)$ is a maximum permissible transmit power configured at the $i^{th}$ subframe of the serving cell c in which the UE is located. i is an integer ranging from 0 to 9. $PL_c$ is an estimation value obtained by the UE by estimating a downlink path loss of the serving cell c. A meaning of delta ($N_l$) is the same as that described in the foregoing.

Step 5: The UE selects a first preamble sequence from a preamble sequence set using the preamble index.

Step 6: The UE sends, on an indicated PRACH resource, the first preamble sequence according to the first transmit power and using the repetition factor $N_1$.

Step 7: In a preset time period after the UE sends the first preamble sequence, if the UE receives no response message corresponding to the first preamble sequence (for example, the second or third case described in the background), the UE determines a transmit power to be used next time (corresponding to the third transmit power in the foregoing embodiments). When the transmit power to be used next time is determined, calculation is performed according to the following formula: PREAMBLE_RECEIVED_TARGET_POWER=preambleInitialReceivedTargetPower+DELTA_PREAMBLE+(PREAMBLE_TRANSMISSION_COUNTER−1)*(powerRampingStep). Then, the PREAMBLE_RECEIVED_TARGET_POWER obtained by calculation is put into the calculation formula in step 4. Calculation is performed again to obtain the transmit power to be used next time.

Step 8: If the transmit power to be used next time that is determined by calculation does not exceed a maximum permissible transmit power of the UE, the UE sends, on the indicated PRACH resource, a third preamble sequence according to the transmit power to be used next time and using the repetition factor $N_1$. In other words, a transmit power increase is performed in this case.

Step 9: If the transmit power to be used next time that is determined by calculation exceeds a maximum permissible transmit power of the UE, the UE switches to a second CE level, that is, switches to a next repetition factor $N_2$.

Step 10: The UE reports the next repetition factor $N_2$ to the MAC layer, and receives a group of sending information that is corresponding to the next repetition factor $N_2$ and that is delivered by the MAC layer.

Step 11: The UE determines an initial transmit power corresponding to the next repetition factor $N_2$. The initial transmit power=$\min\{P_{CMAX,c}(i), \text{PREAMBLE\_RECEIVED\_TARGET\_POWER}+PL_c+\text{delta }(N_{l+1})\}$.

Step 12: The UE selects a second preamble sequence from the preamble sequence set according to a preamble index in the sending information.

Step 13: The UE sends, on an indicated PRACH resource, the second preamble sequence according to the initial transmit power and using the next repetition factor $N_2$. A repetition factor increase is performed in this case.

A second example in this embodiment is a second possible implementation procedure based on an LTE system. The method includes the following content.

Step 1 is similar to step 1 in the first example. A difference lies in that each CE level is corresponding to a maximum repetition factor and is also corresponding to multiple repetition factors within the maximum repetition factor. For example, a first CE level is corresponding to a maximum repetition factor 4. Then, at the first CE level, repetition factors 1 to 4 may be used.

Step 2: A higher-layer request triggers a physical layer to send a preamble. The request includes a preamble index, a target preamble received power (PREAMBLE_RECEIVED_TARGET_POWER), a corresponding RA-RNTI, and PRACH resource information.

Step 3: UE calculates an initial repetition factor according to the following formula:

$$\text{Preamble\_Initial\_Repetition\_Number} = \text{Ceil}\left(10^{\frac{PREAMBLE\_RECEIVED\_TARGET\_POWER+PL_c-P_{CMAX,c}(i)}{10}}\right),$$

where Preamble_Initial_Repetition_Number is the initial repetition factor, Ceil( ) is a round-up function, PREAMBLE_RECEIVED_TARGET_POWER is the target preamble received power, $P_{CMAX,c}(i)$ is a maximum permissible transmit power configured at the $i^{th}$ subframe of a serving cell c in which the UE is located, i is an integer ranging from 0 to 9, and $PL_c$ is an estimation value obtained by the UE by estimating a downlink path loss of the serving cell c.

Step 4: The UE selects a preamble sequence from a preamble sequence set using the preamble index.

Step 5: The UE sends, on an indicated PRACH resource, the selected preamble sequence according to a maximum permissible transmit power and using the initial repetition factor.

Step 6: If an RA-RNTI is used to detect a corresponding PDCCH within a receiving window indicated by a higher layer, but no response message corresponding to the sent preamble sequence is found in a corresponding downlink data block, or the UE fails to receive a response message from a network side, a repetition factor step is added based on the initial repetition factor to obtain a new repetition factor.

Step 7: The UE sends, on the indicated PRACH resource, the selected preamble sequence according to the maximum permissible transmit power and using the new repetition factor. It should be noted that, if the new repetition factor is greater than a maximum repetition factor of a CE level corresponding to the initial repetition factor, the new repetition factor is corresponding to a next CE level; otherwise, the new repetition factor is still corresponding to the CE level that is corresponding to the initial repetition factor.

A third example in this embodiment is a possible preamble sequence sending method based on a UMTS system. The method includes the following content.

Step 1 and step 2 are respectively the same as step 1 and step 2 in the first example. It is assumed that a determined initial repetition factor is the repetition factor $N_1$. Details are not described herein again.

Step 3: UE calculates an initial transmit power Preamble_Initial_Power of a preamble sequence according to the following formula: Preamble_Initial_Power=CPICH_TX_Power−CPICH_RSCP+UL_interference+Constant_Value+delta ($N_1$), where delta ($N_1$) is −10 log ($N_1$) or −10 log ($N_1$)+offset ($N_1$), and offset ($N_1$) is an offset constant corresponding to the repetition factor $N_1$.

Step 4: The UE sends the preamble sequence according to the initial transmit power and using the repetition factor $N_1$.

Step 5: When the UE fails to detect an acquisition indication of a corresponding signature in a downlink access timeslot corresponding to an access timeslot, a next available access timeslot is selected on an available RACH subchannel corresponding to a given ASC, and a new signature is randomly selected from an available signature corresponding to the given ASC.

Step 6: The UE adds a power adjustment step $P_0$ based on the initial transmit power, to obtain an increased transmit power.

Step 7: The UE determines whether the increased transmit power exceeds a maximum permissible transmit power of the UE. If the increased transmit power does not exceed the maximum permissible transmit power of the UE, step 8 is performed. If the increased transmit power exceeds the maximum permissible transmit power of the UE, step 9 is performed.

Step 8: The UE sends a preamble sequence according to the increased transmit power and using the repetition factor $N_1$.

Step 9: The UE switches to a next repetition factor $N_2$, that is, switches to a next CE level.

Step 10: The UE determines an initial transmit power corresponding to the next repetition factor $N_2$. For example, the initial transmit power corresponding to the next repetition factor $N_2$ is determined using a formula $$p_{n+1} = p_n + \Delta P_0 + 10\log\left(\frac{N_l}{N_{l+1}}\right),$$

where $p_{n+1}$ is the initial transmit power corresponding to the next repetition factor $N_2$, $p_n$ is the initial transmit power corresponding to the repetition factor $N_1$, $N_l$ is the repetition factor $N_1$, and $N_{l+1}$ is the next repetition factor $N_2$.

Step 11: The UE sends a preamble sequence according to the initial transmit power corresponding to the next repetition factor $N_2$ and using the next repetition factor $N_2$.

A fourth example in this embodiment is another possible preamble sequence sending method based on a UMTS system. The method includes the following content.

Step 1 and step 2 are respectively the same as step 1 and step 2 in the third example. A difference lies in that each CE level is corresponding to a maximum repetition factor and is also corresponding to multiple repetition factors within the maximum repetition factor. For example, a first CE level is corresponding to a maximum repetition factor 4. Then, at the first CE level, repetition factors 1 to 4 may be used.

Step 3: UE determines an initial repetition factor according to the following formula:

$$\text{Preamble\_Initial\_Repetition\_Number} = \text{Ceil}\left(10^{\frac{CPICH\_TX\_Power-CPICH\_RSCP+UL\_Interference+Constant\_Value-Maximum\_Allowed\_Power}{10}}\right) + \text{offset}$$

($N_k$), where offset ($N_k$) is an offset constant corresponding to a CE level, estimated by the UE, at which the UE is located. For example, if the UE is currently at the first CE level, offset ($N_k$) is offset (4).

Step 4: The UE sends a preamble sequence according to a maximum permissible transmit power of the UE and using the initial repetition factor.

Step 5: If the UE detects an acquisition indication of a corresponding signature in a downlink access timeslot corresponding to an uplink access timeslot, a next available access timeslot is selected on an available RACH subchannel corresponding to a given ASC, and a new signature is randomly selected from an available signature corresponding to the given ASC.

Step 6: The UE adds a repetition factor step $N_0$ based on the initial repetition factor, to obtain a new repetition factor.

Step 7: The UE sends a preamble sequence according to the maximum transmit power of the UE and using the new repetition factor. It should be noted that, if the new repetition factor is greater than a maximum repetition factor of a CE level corresponding to the initial repetition factor, the new repetition factor is corresponding to a next CE level; otherwise, the new repetition factor is still corresponding to the CE level that is corresponding to the initial repetition factor.

Step 8: The UE decreases a preamble sequence retransmission counter by 1.

Step 9: If the retransmission counter is equal to 0, the UE sends a status ("no positive response available on an acquisition indication channel") of a physical layer to a MAC layer and exits a random access procedure at the physical layer.

Based on a same disclosure idea, an embodiment of this application further provides a preamble sequence sending apparatus. For meanings of terms related to the apparatus shown in FIG. 5 and specific implementations, refer to the foregoing FIG. 1 to FIG. 4 and relevant descriptions of the embodiments.

Figure 5:
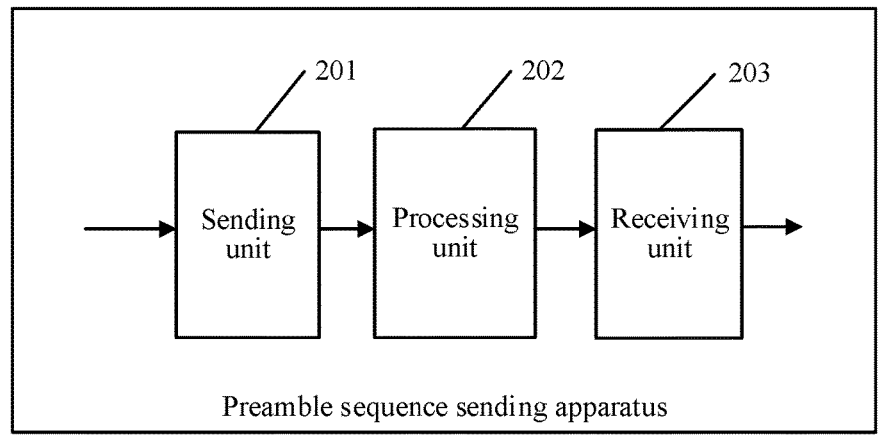
FIG. 5 is a functional block diagram of a preamble sequence sending apparatus according to an embodiment of this application.

Referring to FIG. 5, the apparatus includes a sending unit 201 configured to send a first preamble sequence according to a first transmit power and using a repetition factor $N_1$; and a processing unit 202 configured to switch to a next repetition factor $N_2$ if no response message that is sent by a network-side device and that is corresponding to the first preamble sequence is received in a preset time period after the first preamble sequence is sent. A quantity of consecutive sending times indicated by the next repetition factor $N_2$ is greater than a quantity of consecutive sending times indicated by the repetition factor $N_1$. The sending unit 201 is further configured to send a second preamble sequence according to a second transmit power and using the next repetition factor $N_2$.

Optionally, the processing unit 202 is further configured to, before the sending unit 201 sends the second preamble sequence according to the second transmit power and using the next repetition factor N2, determine the second transmit power using the following formula:

$$P_{PRACH}1=\min\{P_{MAX}, \text{PREAMBLE\_RECEIVED\_TARGET\_POWER1}+PL\},$$

where

PREAMBLE_RECEIVED_TARGET_POWER1= preambleInitialReceivedTargetPower+DELTA_PREAMBLE+(PREAMBLE_TRANSMISSION_COUNTER−1)*(powerRampingStep)+delta($N_{l+1}$), where $P_{PRACH}1$ is the second transmit power, min{ } is a MIN operation, $P_{MAX}$ is a maximum permissible transmit power of UE, PL is an estimation value obtained by the UE by estimating a downlink path loss of a cell in which the UE is located, preambleInitialReceivedTargetPower is an initial target preamble received power, DELTA_PREAMBLE is a preamble sequence format offset value, PREAMBLE_TRANSMISSION_COUNTER is a preamble transmission counter, powerRampingStep is a power adjustment step, $N_{l+1}$ is the next repetition factor $N_2$, and delta ($N_{l+1}$) is a decreasing function of the next repetition factor $N_2$.

Optionally, the processing unit 202 is configured to determine a third transmit power, where the third transmit power is greater than the first transmit power; and switch to the next repetition factor $N_2$ when the third transmit power exceeds the maximum permissible transmit power of the UE.

Optionally, the processing unit 202 determines the third transmit power using the following formula:

$$P_{PRACH}2=\min\{P_{MAX}, \text{PREAMBLE\_RECEIVED\_TARGET\_POWER2}+PL\},$$

where

PREAMBLE_RECEIVED_TARGET_POWER2= preambleInitialReceivedTargetPower+DELTA_PREAMBLE+(PREAMBLE_TRANSMISSION_COUNTER−1)*(powerRampingStep)+delta($N_l$), where $P_{PRACH}2$ is the third transmit power, min{ } is a MIN operation, $P_{MAX}$ is the maximum permissible transmit power of the UE, PL is the estimation value obtained by the UE by estimating the downlink path loss of the cell in which the UE is located, preambleInitialReceivedTargetPower is the initial target preamble received power, DELTA_PREAMBLE is the preamble sequence format offset value, PREAMBLE_TRANSMISSION_COUNTER is the preamble transmission counter, powerRampingStep is the power adjustment step, $N_l$ is the repetition factor $N_1$, and delta ($N_l$) is a decreasing function of the repetition factor $N_1$.

Optionally, the processing unit 202 is further configured to, before the sending unit 201 sends the second preamble sequence according to the second transmit power and using the next repetition factor N2, determine the second transmit power using the following formula:

$$P_{PRACH}3=\min\{P_{MAX}, \text{PREAMBLE\_RECEIVED\_TARGET\_POWER3}+PL+\text{delta}(N_{l+1})\},$$

where $P_{PRACH}3$ is the second transmit power, min{ } is a MIN operation, $P_{MAX}$ is a maximum permissible transmit power of the UE, PL is an estimation value obtained by the UE by estimating a downlink path loss of a cell in which the UE is located, PREAMBLE_RECEIVED_TARGET_POWER3 is a target preamble received power corresponding to the second preamble sequence, $N_{l+1}$ is the next repetition factor $N_2$, and delta ($N_{l+1}$) is a decreasing function of the next repetition factor $N_2$.

Optionally, the processing unit 202 is further configured to, when the first preamble sequence is the first preamble sequence in a random access procedure, before the sending unit 201 sends the first preamble sequence according to the first transmit power and using the repetition factor $N_1$, obtain a target preamble received power corresponding to the first preamble sequence; and determine the first transmit power according to the repetition factor $N_1$, the maximum permissible transmit power of the UE, the target preamble received power corresponding to the first preamble sequence, and the estimation value obtained by the UE by estimating the downlink path loss of the cell in which the UE is located.

Optionally, the processing unit 202 determines the first transmit power using the following formula:

$$P_{PRACH}4=\min\{P_{MAX}, \text{PREAMBLE\_RECEIVED\_TARGET\_POWER4}+PL+\text{delta}(N_l)\},$$

where $P_{PRACH}4$ is the first transmit power, $P_{MAX}$ is the maximum permissible transmit power of the UE, PREAMBLE_RECEIVED_TARGET_POWER is the target preamble received power corresponding to the first preamble sequence, $N_l$ is the repetition factor $N_1$, delta ($N_l$) is a decreasing function of the repetition factor $N_1$, min{ } is a MIN operation, and PL is the estimation value.

Optionally, delta ($N_1$) is $-10 \log (N_1)$ or $-10 \log (N_1)+\text{offset}(N_1)$, and offset ($N_1$) is an offset constant corresponding to the repetition factor $N_1$.

Optionally, Delta ($N_{l+1}$) is $-10 \log (N_{l+1})$ or $-10 \log (N_{l+1})+\text{offset}(N_{l+1})$, and offset ($N_{l+1}$) is an offset constant corresponding to the next repetition factor $N_2$.

Optionally, the processing unit 202 is further configured to, when the first preamble sequence is the first preamble sequence in a random access procedure, obtain a target preamble received power corresponding to the first preamble sequence; obtain an offset constant offset ($N_1$) corresponding to the repetition factor $N_1$; and determine the first transmit power according to the maximum permissible transmit power of the UE, the target preamble received power corresponding to the first preamble sequence, the offset constant offset ($N_1$) corresponding to the repetition factor $N_1$, and the estimation value obtained by estimating the downlink path loss of the cell in which the UE is located.

Optionally, the processing unit 202 determines the first transmit power using the following formula:

$$P_{PRACH}5=\min\{P_{MAX}, \text{PREAMBLE\_RECEIVED\_TARGET\_POWER5}+PL-10\log(N_1)+\text{offset}(N_1)\},$$

where $P_{PRACH}5$ is the first transmit power, min{ } is a MIN operation, $P_{MAX}$ is the maximum permissible transmit power of the UE, PREAMBLE_RECEIVED_TARGET_POWER5 is the target preamble received power corresponding to the first preamble sequence, PL is the estimation value, and $N_I$ is the repetition factor $N_1$.

Optionally, the processing unit 202 is further configured to, before the sending unit 201 sends the first preamble sequence according to the first transmit power and using the repetition factor $N_1$, obtain a group of sending information corresponding to the repetition factor $N_1$, where the sending information includes a preamble index and a PRACH resource; and the sending unit 201 is configured to send, on the PRACH resource, according to the first transmit power and using the repetition factor $N_1$, the first preamble sequence corresponding to the preamble index.

Optionally, the processing unit 202 is configured to, before the sending unit 201 sends the second preamble sequence according to the second transmit power and using the next repetition factor $N_2$, determine the second transmit power using the following formula:

$$p_{n+1} = p_n + \Delta P_0 + 10\log\left(\frac{N_I}{N_{I+1}}\right),$$

where $p_{n+1}$ is the second transmit power, $p_n$ is the first transmit power, $P_0$ is a power adjustment step, $N_I$ is the repetition factor $N_1$, and $N_{I+1}$ is the next repetition factor $N_2$.

Optionally, the processing unit 202 is further configured to, when the first preamble sequence is the first preamble sequence in a random access procedure, determine the first transmit power using the following formula:

Preamble_Initial_Power=CPICH_TX_Power−CPICH_RSCP+UL_interference+Constant_Value+delta($N_I$), where Preamble_Initial_Power is the first transmit power, CPICH_Tx_Power is a transmit power of a downlink pilot channel, CPICH_RSCP is a received power of the downlink pilot channel, UL_Interference is an uplink interference, Constant_Value is a constant, $N_I$ is the repetition factor $N_1$, and delta ($N_I$) is a decreasing function of the repetition factor $N_1$.

Optionally, delta ($N_1$) is −10 log ($N_1$) or −10 log ($N_1$)+ offset ($N_1$), and offset ($N_1$) is an offset constant corresponding to the repetition factor $N_1$.

Optionally, the processing unit 202 is configured to determine the third transmit power, where the third transmit power is greater than the first transmit power; and switch to the next repetition factor $N_2$ when the third transmit power exceeds the maximum permissible transmit power of the UE.

Optionally, the processing unit 202 is further configured to, when the repetition factor $N_1$ is an initial repetition factor, before the sending unit 201 sends the first preamble sequence according to the first transmit power and using the repetition factor $N_1$, determine preamble sequence powers separately corresponding to a first repetition factor and a second repetition factor; and determine that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum power of the UE and the specific constant, or when a preamble sequence power corresponding to the first repetition factor is less than a difference between the maximum permissible transmit power of the UE and a specific constant and a preamble sequence power corresponding to the second repetition factor is greater than or equal to the difference between the maximum power of the UE and the specific constant. The second repetition factor is less than the first repetition factor and is adjacent to the first repetition factor among repetition factors.

Optionally, the repetition factor $N_1$ is corresponding to a first coverage enhancement level of the UE, the next repetition factor $N_2$ is corresponding to a second coverage enhancement level of the UE, and the second coverage enhancement level is higher than the first coverage enhancement level.

Optionally, the processing unit 202 is further configured to obtain the next repetition factor $N_2$ by adding a repetition factor step to the repetition factor $N_1$. The repetition factor $N_1$ is corresponding to a first coverage enhancement level of the UE. When the next repetition factor $N_2$ is less than or equal to a maximum repetition factor corresponding to the first coverage enhancement level, the next repetition factor $N_2$ is corresponding to the first coverage enhancement level. When the next repetition factor $N_2$ is greater than the maximum repetition factor, the next repetition factor $N_2$ is corresponding to a second coverage enhancement level of the UE. The second coverage enhancement level is higher than the first coverage enhancement level.

Optionally, the processing unit 202 is further configured to, when the repetition factor $N_1$ is the initial repetition factor, receive the target preamble received power of the first preamble sequence; and determine the repetition factor $N_1$ according to the target preamble received power, the maximum permissible transmit power of the UE, and the estimation value obtained by the UE by estimating the downlink path loss of the cell in which the UE is located.

Optionally, the processing unit 202 determines the repetition factor $N_1$ using the following formula:

Preamble_Initial_Repetition_Number =

$$\text{Ceil}\left(10^{\frac{PREAMBLE\_RECEIVED\_TARGET\_POWER+PL-P_{MAX}}{10}}\right),$$

where Preamble_Initial_Repetition_Number is the repetition factor $N_1$, Ceil( ) is a round-up function, PREAMBLE_RECEIVED_TARGET_POWER is the target preamble received power, PL is the estimation value, and $P_{MAX}$ is the maximum permissible transmit power.

Optionally, the apparatus further includes a receiving unit 203 configured to receive an offset constant offset ($N_k$) corresponding to the first coverage enhancement level. $N_k$ is the maximum repetition factor corresponding to the first coverage enhancement level.

The processing unit 202 is further configured to determine the repetition factor $N_1$ according to the target preamble received power, the offset constant offset ($N_k$), the maximum permissible transmit power of the UE, and the estimation value obtained by the UE by estimating the downlink path loss of the cell in which the UE is located.

Optionally, the apparatus further includes a receiving unit 203 configured to, when the repetition factor $N_1$ is the initial repetition factor, receive the maximum permissible transmit power of the UE, the constant, and the uplink interference.

The processing unit 202 is further configured to obtain the received power of the downlink pilot channel by means of measurement; obtain the transmit power of the downlink pilot channel; and determine the repetition factor $N_1$ according to the maximum permissible transmit power, the constant, the uplink interference, the received power of the downlink pilot channel, and the transmit power of the downlink pilot channel.

Optionally, the processing unit 202 determines the repetition factor $N_1$ using the following formula:

$$\text{Preamble\_Initial\_Repetition\_Number} = \text{Ceil}\left(10^{\frac{CPICH\_TX\_Power-CPICH\_RSCP+UL\_Interference+Constant\_Value-Maximum\_Allowed\_Power}{10}}\right),$$

where Preamble_Initial_Repetition_Number is the repetition factor $N_1$, Ceil( ) is a round-up function, Maximum_Allowed_Power is the maximum permissible transmit power, CPICH_RSCP is the received power of the downlink pilot channel, CPICH_Tx_Power is the transmit power of the downlink pilot channel, UL_Interference is the uplink interference, and Constant_Value is the constant.

Optionally, the receiving unit 203 is further configured to receive an offset constant offset ($N_k$) corresponding to the first coverage enhancement level. $N_k$ is the maximum repetition factor corresponding to the first coverage enhancement level.

The processing unit 202 is further configured to determine the repetition factor $N_1$ according to the maximum permissible transmit power, the constant, the uplink interference, the received power of the downlink pilot channel, the transmit power of the downlink pilot channel, and the offset constant offset ($N_k$).

Optionally, the first transmit power and the second transmit power are both the maximum permissible transmit power of the UE.

Optionally, the apparatus is UE.

Various variation manners and specific instances of the preamble sequence sending method in the embodiment of FIG. 1 are also applicable to the preamble sequence sending apparatus in this embodiment. According to the detailed description of the preamble sequence sending method, a person skilled in the art may clearly know implementation methods of the preamble sequence sending apparatus in this embodiment. Therefore, for brevity of the specification, details are not described herein again.

Based on the same disclosure idea, an embodiment of this application further provides UE. For meanings of terms related to the user equipment shown in FIG. 6 and specific implementations, refer to the foregoing FIG. 1 to FIG. 4 and relevant descriptions of the embodiments.

Figure 6:
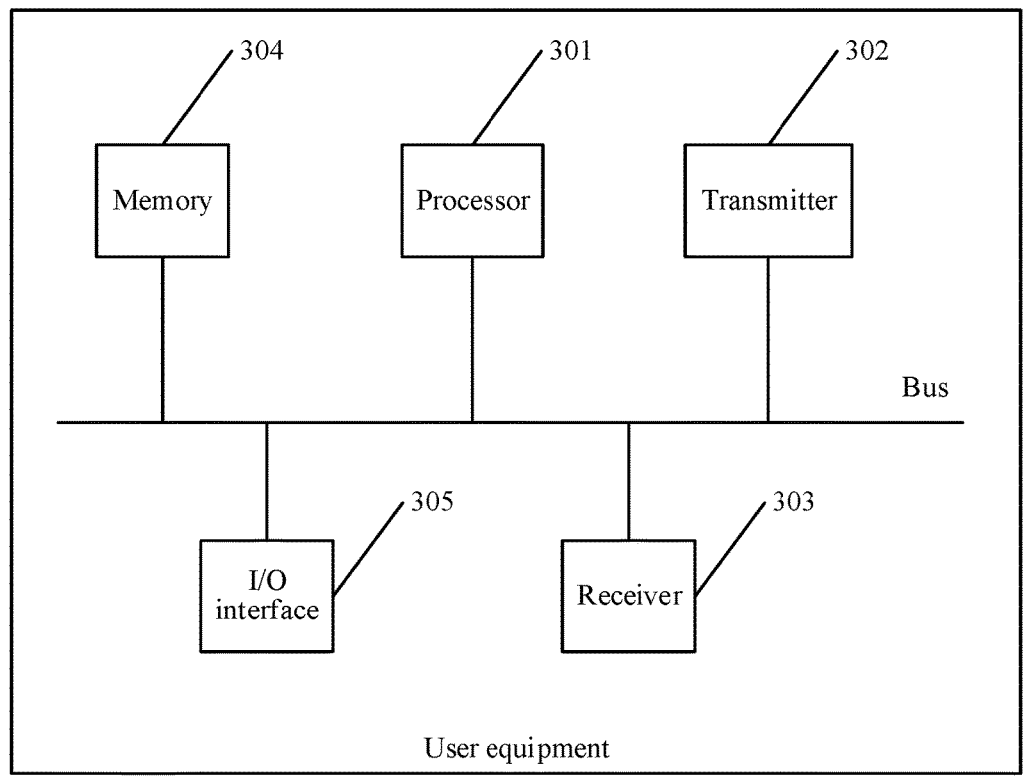
FIG. 6 is a structural block diagram of user equipment according to an embodiment of this application.

Referring to FIG. 6, the user equipment includes a processor 301, a transmitter 302, a receiver 303, a memory 304, and an input/output (I/O) interface 305. The processor 301 may be a general-purpose central processing unit (CPU), or may be an application-specific integrated circuit (ASIC), or may be one or more integrated circuits configured to control program execution. The I/O interface 305 may be connected to a keyboard, a mouse, a touchscreen device, a voice activation and input module, a display, a camera, and the like. There may be one or more memories 304. The memory 304 may include a read-only memory (ROM), a random access memory (RAM), and a disk memory. These memories, the receiver 303, and the transmitter 302 are connected to the processor 301 using a bus. The receiver 303 and the transmitter 302 are configured to perform network communication with an external device. The receiver 303 and the transmitter 302 may communicate with the external device using a network, such as the Ethernet, a radio access network, or a wireless local area network. The receiver 303 and the transmitter 302 may be two physically independent components, or may be a same component physically.

The memory 304 may store an instruction. The processor 301 may execute the instruction stored in the memory 304.

The transmitter 302 is configured to send a first preamble sequence according to a first transmit power and using a repetition factor $N_1$. The processor 301 is configured to switch to a next repetition factor $N_2$ if no response message that is sent by a network-side device and that is corresponding to the first preamble sequence is received in a preset time period after the first preamble sequence is sent. A quantity of consecutive sending times indicated by the next repetition factor $N_2$ is greater than a quantity of consecutive sending times indicated by the repetition factor $N_1$. The transmitter 302 is further configured to send a second preamble sequence according to a second transmit power and using the next repetition factor $N_2$.

Optionally, the processor 301 is further configured to, before the transmitter 302 sends the second preamble sequence according to the second transmit power and using the next repetition factor N2, determine the second transmit power using the following formula:

$$P_{PRACH}1 = \min\{P_{MAX}, \text{PREAMBLE\_RECEIVED\_TARGET\_POWER1} + PL\},$$

where

PREAMBLE_RECEIVED_TARGET_POWER1+ preambleInitialReceivedTargetPower+DELTA_PREAMBLE+(PREAMBLE_TRANSMISSION_COUNTER−1)*(powerRampingStep)+ delta($N_{l+1}$), where $P_{PRACH}1$ is the second transmit power, min{ } is a MIN operation, $P_{MAX}$ is a maximum permissible transmit power of the UE, PL is an estimation value obtained by the UE by estimating a downlink path loss of a cell in which the UE is located, preambleInitialReceivedTargetPower is an initial target preamble received power, DELTA_PREAMBLE is a preamble sequence format offset value, PREAMBLE_TRANSMISSION_COUNTER is a preamble transmission counter, powerRampingStep is a power adjustment step, $N_{l+1}$ is the next repetition factor $N_2$, and delta ($N_{l+1}$) is a decreasing function of the next repetition factor $N_2$.

Optionally, the processor 301 is configured to determine a third transmit power, where the third transmit power is greater than the first transmit power; and switch to the next repetition factor $N_2$ when the third transmit power exceeds the maximum permissible transmit power of the UE.

Optionally, the processor 301 determines the third transmit power using the following formula:

$$P_{PRACH}2 = \min\{P_{MAX}, \text{PREAMBLE\_RECEIVED\_TARGET\_POWER2} + PL\},$$

where

PREAMBLE_RECEIVED_TARGET_POWER2= preambleInitialReceivedTargetPower+DELTA_PREAMBLE+(PREAMBLE_TRANSMISSION_COUNTER−1)*(powerRampingStep)+ delta($N_l$), where $P_{PRACH}2$ is the third transmit power, min{ } is a MIN operation, $P_{MAX}$ is the maximum permissible transmit power of the UE, PL is the estimation value obtained by the UE by estimating the downlink path loss of the cell in which the UE is located, preambleInitialReceivedTargetPower is the initial target preamble received power, DELTA_PREAMBLE is the preamble sequence format offset value, PREAMBLE_TRANSMISSION_COUNTER is the preamble transmission counter, powerRampingStep is the power adjustment step, $N_I$ is the repetition factor $N_1$, and delta $(N_I)$ is a decreasing function of the repetition factor $N_1$.

Optionally, the processor 301 is further configured to, before the transmitter 302 sends the second preamble sequence according to the second transmit power and using the next repetition factor $N_2$, determine the second transmit power using the following formula:

$$P_{PRACH}3 = \min\{P_{MAX}, \text{PREAMBLE\_RECEIVED\_TARGET\_POWER3} + PL + \text{delta}(N_{l+1})\},$$

where $P_{PRACH}3$ is the second transmit power, min{ } is a MIN operation, $P_{MAX}$ is a maximum permissible transmit power of the UE, PL is an estimation value obtained by the UE by estimating a downlink path loss of a cell in which the UE is located, PREAMBLE_RECEIVED_TARGET_POWER3 is a target preamble received power corresponding to the second preamble sequence, $N_{l+1}$ is the next repetition factor $N_2$, and delta $(N_{l+1})$ is a decreasing function of the next repetition factor $N_2$.

Optionally, the processor 301 is further configured to, when the first preamble sequence is the first preamble sequence in a random access procedure, before the transmitter 302 sends the first preamble sequence according to the first transmit power and using the repetition factor $N_1$, obtain a target preamble received power corresponding to the first preamble sequence; and determine the first transmit power according to the repetition factor $N_1$, the maximum permissible transmit power of the UE, the target preamble received power corresponding to the first preamble sequence, and the estimation value obtained by the UE by estimating the downlink path loss of the cell in which the UE is located.

Optionally, the processor 301 determines the first transmit power using the following formula:

$$P_{PRACH}4 = \min\{P_{MAX}, \text{PREAMBLE\_RECEIVED\_TARGET\_POWER4} + PL + \text{delta}(N_l)\},$$

where $P_{PRACH}4$ is the first transmit power, $P_{MAX}$ is the maximum permissible transmit power of the UE, PREAMBLE_RECEIVED_TARGET_POWER is the target preamble received power corresponding to the first preamble sequence, $N_l$ is the repetition factor $N_1$, delta $(N_l)$ is a decreasing function of the repetition factor $N_1$, min{ } is a MIN operation, and PL is the estimation value.

Optionally, delta $(N_1)$ is $-10 \log (N_1)$ or $-10 \log (N_1) + $ offset $(N_1)$, and offset $(N_1)$ is an offset constant corresponding to the repetition factor $N_1$.

Optionally, Delta $(N_{l+1})$ is $-10 \log (N_{l+1})$ or $-10 \log (N_{l+1}) + $ offset $(N_{l+1})$, and offset $(N_{l+1})$ is an offset constant corresponding to the next repetition factor $N_2$.

Optionally, the processor 301 is further configured to, when the first preamble sequence is the first preamble sequence in a random access procedure, obtain a target preamble received power corresponding to the first preamble sequence; obtain an offset constant offset $(N_1)$ corresponding to the repetition factor $N_1$; and determine the first transmit power according to the maximum permissible transmit power of the UE, the target preamble received power corresponding to the first preamble sequence, the offset constant offset $(N_1)$ corresponding to the repetition factor $N_1$, and the estimation value obtained by estimating the downlink path loss of the cell in which the UE is located.

Optionally, the processor 301 determines the first transmit power using the following formula:

$$P_{PRACH}5 = \min\{P_{MAX}, \text{PREAMBLE\_RECEIVED\_TARGET\_POWER5} + PL - 10 \log(N_1) + \text{offset}(N_1)\},$$

where $P_{PRACH}5$ is the first transmit power, min{ } is a MIN operation, $P_{MAX}$ is the maximum permissible transmit power of the UE, PREAMBLE_RECEIVED_TARGET_POWER5 is the target preamble received power corresponding to the first preamble sequence, PL is the estimation value, and $N_l$ is the repetition factor $N_1$.

Optionally, the processor 301 is further configured to, before the transmitter 302 sends the first preamble sequence according to the first transmit power and using the repetition factor $N_1$, obtain a group of sending information corresponding to the repetition factor $N_1$. The sending information includes a preamble index and a PRACH resource.

The transmitter 302 is configured to send, on the PRACH resource, according to the first transmit power and using the repetition factor $N_1$, the first preamble sequence corresponding to the preamble index.

Optionally, the processor 301 is configured to, before the transmitter 302 sends the second preamble sequence according to the second transmit power and using the next repetition factor $N_2$, determine the second transmit power using the following formula:

$$p_{n+1} = p_n + \Delta P_0 + 10\log\left(\frac{N_l}{N_{l+1}}\right),$$

where $p_{n+1}$ is the second transmit power, $p_n$ is the first transmit power, $P_0$ is a power adjustment step, $N_l$ is the repetition factor $N_1$, and $N_{l+1}$ is the next repetition factor $N_2$.

Optionally, the processor 301 is further configured to, when the first preamble sequence is the first preamble sequence in a random access procedure, determine the first transmit power using the following formula:

Preamble_Initial_Power=CPICH_TX_Power−CPICH_RSCP+UL_interference+Constant_Value+delta$(N_l)$, where Preamble_Initial_Power is the first transmit power, CPICH_Tx_Power is a transmit power of a downlink pilot channel, CPICH_RSCP is a received power of the downlink pilot channel, UL_Interference is an uplink interference, Constant_Value is a constant, $N_l$ is the repetition factor $N_1$, and delta $(N_l)$ is a decreasing function of the repetition factor $N_1$.

Optionally, delta $(N_1)$ is $-10 \log (N_1)$ or $-10 \log (N_1) +$ offset $(N_1)$, and offset $(N_1)$ is an offset constant corresponding to the repetition factor $N_1$.

Optionally, the processor 301 is configured to determine the third transmit power, where the third transmit power is greater than the first transmit power; and switch to the next repetition factor $N_2$ when the third transmit power exceeds the maximum permissible transmit power of the UE.

Optionally, the processor 301 is further configured to, when the repetition factor $N_1$ is an initial repetition factor, before the transmitter 302 sends the first preamble sequence according to the first transmit power and using the repetition factor $N_1$, determine preamble sequence powers separately corresponding to a first repetition factor and a second repetition factor; and determine that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum power of the UE and the specific constant, or when a preamble sequence power corresponding to the first repetition factor is less than a difference between the maximum permissible transmit power of the UE and a specific constant and a preamble sequence power corresponding to the second repetition factor is greater than or equal to the difference between the maximum power of the UE and the specific constant. The second repetition factor is less than the first repetition factor and is adjacent to the first repetition factor among repetition factors.

Optionally, the repetition factor $N_1$ is corresponding to a first coverage enhancement level of the UE, the next repetition factor $N_2$ is corresponding to a second coverage enhancement level of the UE, and the second coverage enhancement level is higher than the first coverage enhancement level.

Optionally, the processor 301 is further configured to obtain the next repetition factor $N_2$ by adding a repetition factor step to the repetition factor $N_1$. The repetition factor $N_1$ is corresponding to a first coverage enhancement level of the UE. When the next repetition factor $N_2$ is less than or equal to a maximum repetition factor corresponding to the first coverage enhancement level, the next repetition factor $N_2$ is corresponding to the first coverage enhancement level. When the next repetition factor $N_2$ is greater than the maximum repetition factor, the next repetition factor $N_2$ is corresponding to a second coverage enhancement level of the UE. The second coverage enhancement level is higher than the first coverage enhancement level.

Optionally, the processor 301 is further configured to, when the repetition factor $N_1$ is the initial repetition factor, receive the target preamble received power of the first preamble sequence; and determine the repetition factor $N_1$ according to the target preamble received power, the maximum permissible transmit power of the UE, and the estimation value obtained by the UE by estimating the downlink path loss of the cell in which the UE is located.

Optionally, the processor 301 determines the repetition factor $N_1$ using the following formula:

$$\text{Preamble\_Initial\_Repetition\_Number} = \text{Ceil}\left(10^{\frac{PREAMBLE\_RECEIVED\_TARGET\_POWER+PL-P_{MAX}}{10}}\right),$$

where Preamble_Initial_Repetition_Number is the repetition factor $N_1$, Ceil( ) is a round-up function, PREAMBLE_RECEIVED_TARGET_POWER is the target preamble received power, PL is the estimation value, and $P_{MAX}$ is the maximum permissible transmit power.

Optionally, the apparatus further includes the receiver 303 configured to receive an offset constant offset ($N_k$) corresponding to the first coverage enhancement level. $N_k$ is the maximum repetition factor corresponding to the first coverage enhancement level.

The processor 301 is further configured to determine the repetition factor $N_1$ according to the target preamble received power, the offset constant offset ($N_k$), the maximum permissible transmit power of the UE, and the estimation value obtained by the UE by estimating the downlink path loss of the cell in which the UE is located.

Optionally, the apparatus further includes the receiver 303 configured to receive the maximum permissible transmit power of the UE, the constant, and the uplink interference when the repetition factor $N_1$ is the initial repetition factor.

The processor 301 is further configured to obtain the received power of the downlink pilot channel by means of measurement; obtain the transmit power of the downlink pilot channel; and determine the repetition factor $N_1$ according to the maximum permissible transmit power, the constant, the uplink interference, the received power of the downlink pilot channel, and the transmit power of the downlink pilot channel.

Optionally, the processor 301 determines the repetition factor $N_1$ using the following formula:

$$\text{Preamble\_Initial\_Repetition\_Number} = \text{Ceil}\left(10^{\frac{CPICH\_TX\_Power-CPICH\_RSCP+UL\_Interference+Constant\_Value-Maximum\_Allowed\_Power}{10}}\right),$$

where Preamble_Initial_Repetition_Number is the repetition factor $N_1$, Ceil( ) is a round-up function, Maximum_Allowed_Power is the maximum permissible transmit power, CPICH_RSCP is the received power of the downlink pilot channel, CPICH_Tx_Power is the transmit power of the downlink pilot channel, UL_Interference is the uplink interference, and Constant_Value is the constant.

Optionally, the receiver 303 is further configured to receive an offset constant offset ($N_k$) corresponding to the first coverage enhancement level. $N_k$ is the maximum repetition factor corresponding to the first coverage enhancement level.

The processor 301 is further configured to determine the repetition factor $N_1$ according to the maximum permissible transmit power, the constant, the uplink interference, the received power of the downlink pilot channel, the transmit power of the downlink pilot channel, and the offset constant offset ($N_k$).

Optionally, the first transmit power and the second transmit power are both the maximum permissible transmit power of the UE.

Various variation manners and specific instances of the preamble sequence sending method in the embodiment of FIG. 1 are also applicable to the user equipment in this embodiment. According to the foregoing detailed description of the preamble sequence sending method, a person skilled in the art may clearly know implementation methods of the user equipment in this embodiment. Therefore, for brevity of the specification, details are not described herein again.

One or more technical solutions provided in the embodiments of this application at least have the following technical effects or advantages.

In the embodiments of this application, first, when a preamble sequence is sent, time domain repetition is performed in a form of a repetition factor, and therefore, a transmission success rate of the preamble sequence can be improved. Further, when no response message corresponding to the sent preamble sequence is received, the repetition factor is increased. This can further improve a signal coverage area, thereby improving the transmission success rate of the preamble sequence. Compared with a method of increasing a transmit power in the prior art, the method in the embodiments of this application is more effective and practical because there is no increase bottleneck such as a maximum permissible transmit power.

It should be noted that, in the embodiments of the present disclosure, obtaining a variable or parameter according to a formula not only includes running software using a processor or running an algorithm based on the formula using a hardware logical circuit to obtain the variable or parameter, but also includes searching a lookup table to obtain the variable or parameter. A logical relationship between an input entry and an output entry of the lookup table meets an input and output algorithm principle of the formula. Alternatively, the variable or parameter may be obtained by running software by a processor or by means of calculation, by a hardware logical circuit, according to another formula that is a variation of the formula. The obtaining the variable or parameter still meets an operational rule of the formula. For example, formulas that are variations of the formula (9) may also be used as a basis for determining the second transmit power, but it may be still considered that the second transmit power is obtained according to the formula (9). Therefore, in the embodiments of the present disclosure, descriptions of obtaining a variable or parameter according to a formula include a case in which the variable or parameter is obtained according to another equivalent variation formula of the formula.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A preamble sequence sending method, comprising:

sending, by user equipment (UE), a first preamble sequence according to a first transmit power and using a repetition factor $N_1$;

switching, by the UE, to a next repetition factor $N_2$ when the UE fails to receive, in a preset time period after the first preamble sequence is sent, a response message from a network-side device and corresponding to the first preamble sequence, wherein a quantity of consecutive sending times indicated by the next repetition factor $N_2$ is greater than a quantity of consecutive sending times indicated by the repetition factor $N_1$;

determining, by the UE, a second transmit power using the following formula:

$$P_{PRACH}1 = \min\{P_{MAX}, \text{PREAMBLE\_RECEIVED\_TARGET\_POWER1} + PL\},$$

wherein PREAMBLE_RECEIVED_TARGET_POWER1 = preambleInitialReceivedTargetPower+DELTA_PREAMBLE+(PREAMBLE_TRANSMISSION_COUNTER−1)*(powerRampingStep)+delta($N_{i+1}$), wherein $P_{PRACH}1$ is the second transmit power, min{ } is a MIN operation, wherein $P_{MAX}$ is a maximum permissible transmit power of the UE, wherein PREAMBLE_RECEIVED_TARGET_POWER1 is a target preamble received power corresponding to a second preamble sequence, wherein PL is an estimation value obtained by the UE by estimating a downlink path loss of a cell in which the UE is located, wherein preambleInitialReceivedTargetPower is an initial target preamble received power, wherein DELTA_PREAMBLE is a preamble sequence format offset value, wherein PREAMBLE_TRANSMISSION_COUNTER is a preamble transmission counter, wherein powerRampingStep is a power adjustment step, $N_{i+1}$ is the next repetition factor $N_2$, and wherein delta ($N_{i+1}$) is a decreasing function of the next repetition factor $N_2$; and sending, by the UE, the second preamble sequence according to the second transmit power and using the next repetition factor $N_2$.

2. The method according to claim 1, wherein switching, by the UE, to the next repetition factor $N_2$ comprises:

determining, by the UE, a third transmit power, wherein the third transmit power is greater than the first transmit power; and switching to the next repetition factor $N_2$ when the third transmit power exceeds the maximum permissible transmit power of the UE.

3. The method according to claim 1, wherein when the first preamble sequence is the first preamble sequence in a random access procedure, the method further comprises:

obtaining, by the UE, a target preamble received power corresponding to the first preamble sequence;

obtaining, by the UE, an offset constant offset ($N_1$) corresponding to the repetition factor $N_1$; and determining, by the UE, the first transmit power according to the maximum permissible transmit power of the UE, the target preamble received power corresponding to the first preamble sequence, the offset constant offset ($N_1$) corresponding to the repetition factor $N_1$, and an estimation value obtained by the UE by estimating the downlink path loss of the cell in which the UE is located.

4. The method according to claim 1, wherein before sending, by the UE, the first preamble sequence according to the first transmit power and using the repetition factor $N_1$, the method further comprises obtaining, by the UE, a group of sending information corresponding to the repetition factor $N_1$, wherein the sending information comprises a preamble index and a physical random access channel (PRACH) resource, and wherein sending, by the UE, the first preamble sequence according to the first transmit power and using the repetition factor $N_1$ comprises sending, by the UE and on the PRACH resource, according to the first transmit power and using the repetition factor $N_1$, the first preamble sequence corresponding to the preamble index.

5. The method according to claim 1, wherein when the repetition factor $N_1$ is an initial repetition factor, before sending, by the UE, the first preamble sequence according to the first transmit power and using the repetition factor $N_1$, the method further comprises:
determining, by the UE, preamble sequence powers separately corresponding to a first repetition factor and a second repetition factor;
determining that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum permissible transmit power of the UE and the specific constant; and
determining that the first repetition factor is the repetition factor $N_1$ when a preamble sequence power corresponding to the first repetition factor is less than a difference between the maximum permissible transmit power of the UE and a specific constant and a preamble sequence power corresponding to the second repetition factor is greater than or equal to the difference between the maximum permissible transmit power of the UE and the specific constant, wherein the second repetition factor is less than the first repetition factor and is adjacent to the first repetition factor among repetition factors.

6. The method according to claim 1, wherein the repetition factor $N_1$ is corresponding to a first coverage enhancement level of the UE, wherein the next repetition factor $N_2$ is corresponding to a second coverage enhancement level of the UE, and wherein the second coverage enhancement level is higher than the first coverage enhancement level.

7. The method according to claim 1, wherein before switching, by the UE, to the next repetition factor $N_2$, the method comprises obtaining, by the UE, the next repetition factor $N_2$ by adding a repetition factor step to the repetition factor $N_1$, wherein the repetition factor $N_1$ is corresponding to a first coverage enhancement level of the UE, wherein the next repetition factor $N_2$ is corresponding to the first coverage enhancement level when the next repetition factor $N_2$ is less than or equal to a maximum repetition factor corresponding to the first coverage enhancement level, wherein the next repetition factor $N_2$ is corresponding to a second coverage enhancement level of the UE when the next repetition factor $N_2$ is greater than the maximum repetition factor, and wherein the second coverage enhancement level is higher than the first coverage enhancement level.

8. The method according to claim 1, wherein delta ($N_{i+1}$) is $-10 \log (N_{i+1})$.

9. A preamble sequence sending apparatus, comprising:
a memory configured to store software instructions; and
a processor coupled to the memory and configured to execute the software instructions to perform:
sending a first preamble sequence according to a first transmit power and using a repetition factor $N_1$;
switching to a next repetition factor $N_2$ when no response message from a network-side device and corresponding to the first preamble sequence is received in a preset time period after the first preamble sequence is sent, wherein a quantity of consecutive sending times indicated by the next repetition factor $N_2$ is greater than a quantity of consecutive sending times indicated by the repetition factor $N_1$;
determining a second transmit power using the following formula:

$P_{PRACH}1 = \min\{P_{MAX}, \text{PREAMBLE\_RECEIVED\_TARGET\_POWER1} + PL\}$, wherein PREAMBLE_RECEIVED_TARGET_POWER1 = preambleInitialReceivedTargetPower+DELTA_PREAMBLE+(PREAMBLE_TRANSMISSION_COUNTER−1)*(powerRampingStep)+delta($N_{i+1}$), wherein $P_{PRACH}1$ is the second transmit power, min{ } is a MIN operation,
wherein $P_{MAX}$ is a maximum permissible transmit power of user equipment (UE),
wherein PREAMBLE_RECEIVED_TARGET_POWER1 is a target preamble received power corresponding to a second preamble sequence,
wherein PL is an estimation value obtained by the UE by estimating a downlink path loss of a cell in which the UE is located,
wherein preambleInitialReceivedTargetPower is an initial target preamble received power,
wherein DELTA_PREAMBLE is a preamble sequence format offset value,
wherein PREAMBLE_TRANSMISSION_COUNTER is a preamble transmission counter,
wherein powerRampingStep is a power adjustment step,
wherein $N_{i+1}$ is the next repetition factor $N_2$, and
wherein delta ($N_{i+1}$) is a decreasing function of the next repetition factor $N_2$; and
sending the second preamble sequence according to the second transmit power and using the next repetition factor $N_2$.

10. The apparatus according to claim 9, wherein the processor is further configured to perform:
determining a third transmit power, wherein the third transmit power is greater than the first transmit power; and
switching to the next repetition factor $N_2$ when the third transmit power exceeds the maximum permissible transmit power of the UE.

11. The apparatus according to claim 9, wherein the processor is further configured to perform:
obtaining a target preamble received power corresponding to the first preamble sequence when the first preamble sequence is the first preamble sequence in a random access procedure;
obtaining an offset constant offset ($N_1$) corresponding to the repetition factor $N_1$; and
determining the first transmit power according to the maximum permissible transmit power of the UE, the target preamble received power corresponding to the first preamble sequence, the offset constant offset ($N_1$) corresponding to the repetition factor $N_1$, and an estimation value obtained by estimating the downlink path loss of the cell in which the UE is located.

12. The apparatus according to claim 9, wherein before sending the first preamble sequence according to the first transmit power and using the repetition factor $N_1$, the processor is further configured to perform:
   obtaining a group of sending information corresponding to the repetition factor $N_1$, wherein the sending information comprises a preamble index and a physical random access channel (PRACH) resource; and
   sending, on the PRACH resource, according to the first transmit power and using the repetition factor $N_1$, the first preamble sequence corresponding to the preamble index.

13. The apparatus according to claim 9, wherein the processor is further configured to perform:
   determining, before sending the first preamble sequence according to the first transmit power and using the repetition factor $N_1$, preamble sequence powers separately corresponding to a first repetition factor and a second repetition factor when the repetition factor $N_1$ is an initial repetition factor;
   determining that the first repetition factor is the repetition factor $N_1$ when a preamble sequence power corresponding to the first repetition factor is less than or equal to a difference between the maximum permissible transmit power of the UE and a specific constant and a preamble sequence power corresponding to the second repetition factor is greater than the difference between the maximum permissible transmit power of the UE and the specific constant; and
   determining that the first repetition factor is the repetition factor $N_1$ when a preamble sequence power corresponding to the first repetition factor is less than a difference between the maximum permissible transmit power of the UE and a specific constant and a preamble sequence power corresponding to the second repetition factor is greater than or equal to the difference between the maximum permissible transmit power of the UE and the specific constant, wherein the second repetition factor is less than the first repetition factor and is adjacent to the first repetition factor among repetition factors.

14. The apparatus according to claim 9, wherein the repetition factor $N_1$ is corresponding to a first coverage enhancement level of the UE, wherein the next repetition factor $N_2$ is corresponding to a second coverage enhancement level of the UE, and wherein the second coverage enhancement level is higher than the first coverage enhancement level.

15. The apparatus according to claim 9, wherein the processor is further configured to perform obtaining the next repetition factor $N_2$ by adding a repetition factor step to the repetition factor $N_1$, wherein the repetition factor $N_1$ is corresponding to a first coverage enhancement level of the UE, wherein the next repetition factor $N_2$ is corresponding to the first coverage enhancement level when the next repetition factor $N_2$ is less than or equal to a maximum repetition factor corresponding to the first coverage enhancement level, wherein the next repetition factor $N_2$ is corresponding to a second coverage enhancement level of the UE when the next repetition factor $N_2$ is greater than the maximum repetition factor, and wherein the second coverage enhancement level is higher than the first coverage enhancement level.

16. The apparatus according to claim 9, wherein delta ($N_{l+1}$) is $-10 \log (N_{l+1})$.

* * * * *